United States Patent [19]

Lippitt

[11] 4,090,116

[45] May 16, 1978

[54] CLOSED LOOP DIGITAL CONTROL SYSTEM AND METHOD FOR MOTOR CONTROL

[75] Inventor: David L. Lippitt, Scotia, N.Y.

[73] Assignee: General Electric Company, Salem, Va.

[21] Appl. No.: 749,648

[22] Filed: Dec. 10, 1976

[51] Int. Cl.² .............................................. H02P 7/28
[52] U.S. Cl. .................... 318/345 E; 364/107; 364/118; 364/121; 364/300; 318/329; 318/327
[58] Field of Search .................. 318/327, 329, 345 E, 318/345 C, 345 G; 364/107, 118, 121, 300

[56] References Cited

U.S. PATENT DOCUMENTS 3,614,571  10/1971  Koch ................................ 318/345 E Primary Examiner—Robert K. Schaefer
Assistant Examiner—Michael K. Mutter
Attorney, Agent, or Firm—Arnold E. Renner

[57] ABSTRACT

A speed regulator and control system for controlling a motor from a polyphase AC source includes a data processor and a regulator and rectifier control interfacing the data processor with a controllable rectifier driving the motor is disclosed. The regulator and rectifier control, under control of the data processor, selectively transfers system parameters to the data processor, receives a calculated value proportional to firing angle from the data processor and supplies firing pulses to the rectifier to selectively connect each phase of the AC source to the motor as calculated by the data processor.

17 Claims, 25 Drawing Figures

CLOSED LOOP DIGITAL CONTROL SYSTEM AND METHOD FOR MOTOR CONTROL

BACKGROUND OF THE INVENTION

The present invention relates generally to digital motor speed regulator systems providing method and apparatus for controlling the flow of power from an AC source to a load such as a DC motor. More specifically, the present invention relates to a digital control system for the direct digital firing of controllable rectifiers placed between an AC source and a DC motor for controlling the conduction of such rectifiers.

Motor control systems of the type described herein, frequently use power amplifiers having control rectifiers which vary the control of electrical energy between an alternating current source and a drive motor. Control rectifiers are well known in the art and generally consist of a family of devices which present a relatively high impedance to the flow of electrical energy until they are forward biased by a firing signal applied to a gate electrode. At the time of conduction, a control rectifier normally provides a very low impedance to the flow of current and continues to conduct current until it is back biased and/or the level of the current flowing to the rectifier is decreased below a minimum holding level necessary to keep the rectifier conducting. The family of control rectifiers being discussed generally includes semiconductor devices such as silicon controlled rectifiers (thyristors) and other devices such as ignitrons and thyratrons.

In systems, such as the type being described, the amount of power transferred to a system load or DC motor is controlled by varying the duration of the conduction of controllable rectifiers. Generally speaking, the duration of conduction of the controllable rectifiers is a function of the point during the AC wave form in which they are initiated into conduction. This point is referred to as the firing angle.

In the past, systems for controlling the conduction of controllable rectifiers, have generally been accomplished by using analog control devices to perform the regulating functions required and converting the analog signal into digital values to fire the rectifiers. In these types of systems, the firing circuits act in response to an input signal indicative of desired power to generate a firing pulse at the appropriate firing angle. Generally speaking, the firing angle is directly proportional to the input signal. Analog systems of the prior art generally operate in response to an input signal whose magnitude indicates the desired firing angle.

In recent years, however, with the development of digital techniques and hardware, engineers have become interested in utilizing digital circuitry in these types of control systems. The application of digital techniques to such control systems is particularly advantageous where the system requires that degree of accuracy, reliability or drift free operation which is available only with digital circuitry. Hence, it is becoming fairly common to replace elements of an analog system with functionally equivalent digital circuitry. One such known digital control system for controlling the conduction of controllable rectifiers, is disclosed in U.S. Pat. No. 3,601,674 entitled "CONTROL SYSTEM FOR FIRING SCR's IN POWER CONVERSION APPARATUS" to Albert F. Koch and assigned to the assignee of the present invention. In that patent a digital control system is disclosed for controlling the flow of power through controllable rectifiers from a multiphase AC source to a load. That system includes a firing circuit for each phase, wherein, each firing circuit comprises a reversible counter and a digital comparator. Phase detection logic is incorporated which examines the three phases of the AC source so as to synchronously initiate a control interval for an appropriate rectifier by presetting a predetermined positive or negative digital number into the reversible counter associated with each phase. The reversible counter then counts down, if the preset number is positive, or up if the preset number is negative, during the control interval. During counting, a digital speed error signal derived from a previous comparison of a digital command with a digital feedback signal indicative of motor speed is continuously compared with the contents of the reversible counter in a digital comparator. When the error exceeds the contents of the reversible counter, a firing pulse is generated which is applied to a positive or negative poled rectifier firing the respectively poled rectifier in accordance with the positive or negative number.

Another prior art system of the digital type has been described in two papers: the first by R. D. Jackson and R. D. Weatherby, entitled "DIRECTION DIGITAL CONTROL OF THYRISTOR CONVERTERS" in IFAC Symposium on Control and Power Electronics and Electrical Drives, October 1974, held in Dusseldorf, Germany preprint Volume I, pages 431–441; and the second paper by F. Fallside and R. D. Jackson entitled "DIRECT DIGITAL CONTROL OF THYRISTOR AMPLIFIERS" in the Proceedings of The Institute of Electrical Engineers - Control and Science, Volume 116, No. 5, pp. 873–878 May, 1969.

In the above mentioned papers, the authors describe a study of a laboratory system of the direct digital control type to demonstrate the feasibility of direct digital control of controllable rectifiers such as silicon control rectifiers. In this system a programmed digital computer is employed to control the firing of rectifiers through an interface apparatus to control a resistive-capacitive load by the generation of firing pulses generated from the computer. The digital computer computes the firing angle which specifies a time to fire a particular rectifier. The system is synchronized to the phase to neutral crossings of the phase voltages of the AC source, such phase crossings initiating command signals for a sample and hold circuit for an analog to digital converter which measures the system load output voltage.

At the end of the analog to digital conversion, a pulse is generated from the converter as an interrupt signal to the computer. This pulse starts the firing angle calculation. Subsequent to the initiation of the interrupt signal, the computer reads the analog to digital converter at a specified time after the phase crossover instant. The computer then proceeds to calculate the firing angle or firing instant for the rectifier utilizing what is referred to as a given firing law. In this calculation, a control signal or value is developed which is continuously compared with a linear lookup table, containing values defining the firing law, until a match exists between the control signal and the contents of the table. When a comparison is reached, a firing pulse is generated by setting up the address of the rectifier to be fired and strobing a firing signal to the rectifier.

While the authors did demonstrate the feasibility of direct digital control of controllable rectifiers, they also recognized that various practical difficulties were experienced in setting up a system of this type. This was apparent in the most obvious implementation in these experiments of the use of lookup tables which takes a considerable amount of computer time and severely restricts the amount of additional computation time needed by the computer in operating a real time system of this type.

Further, it is to be recognized that direct digital drive control systems must sample the load output voltage at a specified instant in time as related to a detected phase interval of the AC source, then perform the necessary firing angle calculation and fire a selected rectifier within that detected interval, and at a time early enough in the specified interval in order to accurately and fully control the retardation of the firing angle to obtain maximum transfer of power to the load.

The above described systems did not function to perform as total motor speed control systems for controlling a variable speed reversible drive motor. In analog systems the manner of controlling the speed of a DC motor, when operating in either continuous or discontinuous current mode, is well known as is the manner of reversing the direction of the motor. It is also known that one criteria for reversing the direction of a DC motor is that the motor current be zero at the time of reversal. In analog systems, in order to make this reversal it is first necessary to detect when the current is zero and then to wait a specified safe period before reversing the motor. Additionally, it is also known in analog motor drives systems that two feed-back loops are required, one to control the motor when it is in continuous current mode operation and one to control the motor when it is in discontinuous current mode operation. These two loops provide separate gains to the system dependent upon the mode of operation. This method of operation in analog control systems has proven to be somewhat unsatisfactory in DC motor drives systems, particularly when it is desired to achieve a high degree of constant motor speed operation under very light load conditions. Thus, it is desirable to provide a DC motor speed drive and regulator system which enhances the overall operation of the system by providing a regulator which measures system parameters and accurately calculates motor speed, determines the mode of operation of the system, and promptly sets system gains, determines the motor direction of rotation and changes the direction of motor rotation instantaneously without a delay if required to do so.

It is, therefore, an object to provide an improved control system for the direct digital firing of rectifiers to control a DC motor.

It is further object to provide a digital regulator and motor control system for monitoring system parameters and calculating a firing angle from such parameters to generate a firing pulse to control a rectifier supplying power to a motor to provide maximum delivery of power to the motor.

Still a further object is to provide a method in a digital regulator motor control system for reading system parameters and determining the mode of operation of the system to control the overall system gain in accordance with the determined mode and to calculate a firing angle from the parameters and the determined gain to fire a rectifier at a specified instant in accordance with the calculated firing angle.

It is still another object to provide a direct digital firing control system, for controlling a DC motor, having a data processor which performs calculations in response to a firing pulse generated by the system to enable the processor to determine the direction of rotation of the motor and a desired direction of rotation of the motor and to calculate a firing angle specifying the instant for the firing of a selected rectifier in accordance with the determined direction of motor rotation, such firing angle calculation being performed in sufficient time to allow the rectifier to be fired early enough in a phase interval of the AC source to deliver maximum power to the DC motor.

The foregoing and other objects are achieved in accordance with the present invention through the provision of a control system for direct digital firing of controllable rectifiers through the implementation of a programmed data processor and interface means in which the processor monitors system parameters proportional to desired motor speed, actual motor speed, and motor direction, and motor current and calculates a firing angle specifying an instant at which a selected rectifier is to be fired to deliver maximum power to a DC motor in accordance with the direction of motor rotation. The interface means includes logic or counter means for receiving the calculated value of firing angle from the processor to generate a firing pulse for a selected rectifier when the counter achieves a specified count while simultaneously applying the firing pulse to the processor as an interrupt to signal the processor to calculate a new firing angle for a subsequent rectifier to be fired.

In the present invention the complete calculation of firing angle, the selection of a rectifier to be fired, and the determination and selection of the mode of operation of the system, and the direction of motor rotation are all performed in sufficient time to allow the processor to generate a firing angle for use in firing the selected rectifier in a predetermined phase interval of the AC source to allow maximum delivery of power to the DC motor.

The present invention extends the state of the art of DC motor control systems utilizing a data processor to provide digital regulation of rate of change of motor current, speed and direction, including compensation for motor and system time constants and compensation for continuous and discontinuous current modes of operation and further provides means of adjusting transient performance as determined by the processor.

Clock means in the interface means monitors the AC power source and provides indicia to the processor representative of a time interval of the AC source referenced to the phase crossings of each of the phases and further specifies value proportional to time within each of the intervals. The indicia are utilized by the computer to calculate a time for the processor to load the calculated value of firing angle into the counter of the interface means and to also calculate the selection of the proper rectifier to be fired.

BRIEF DESCRIPTION OF THE DRAWING

While the present invention is described in particularity in the claims annexed to and forming a part of this specification, a better understanding of the invention can be had by reference to the following description taken in conjunction with the accompanying drawing in which:

FIGS. 11A and 11B taken together, with FIG. 11A placed at the top of FIG. 11B, illustrate in detailed logic diagram and schematic form the SCR select and drive direction logic, rectifiers and the analog to digital converter of FIG. 3 and the interconnections thus between.

DESCRIPTION OF THE PREFERRED EMBODIMENT

Figure 1:
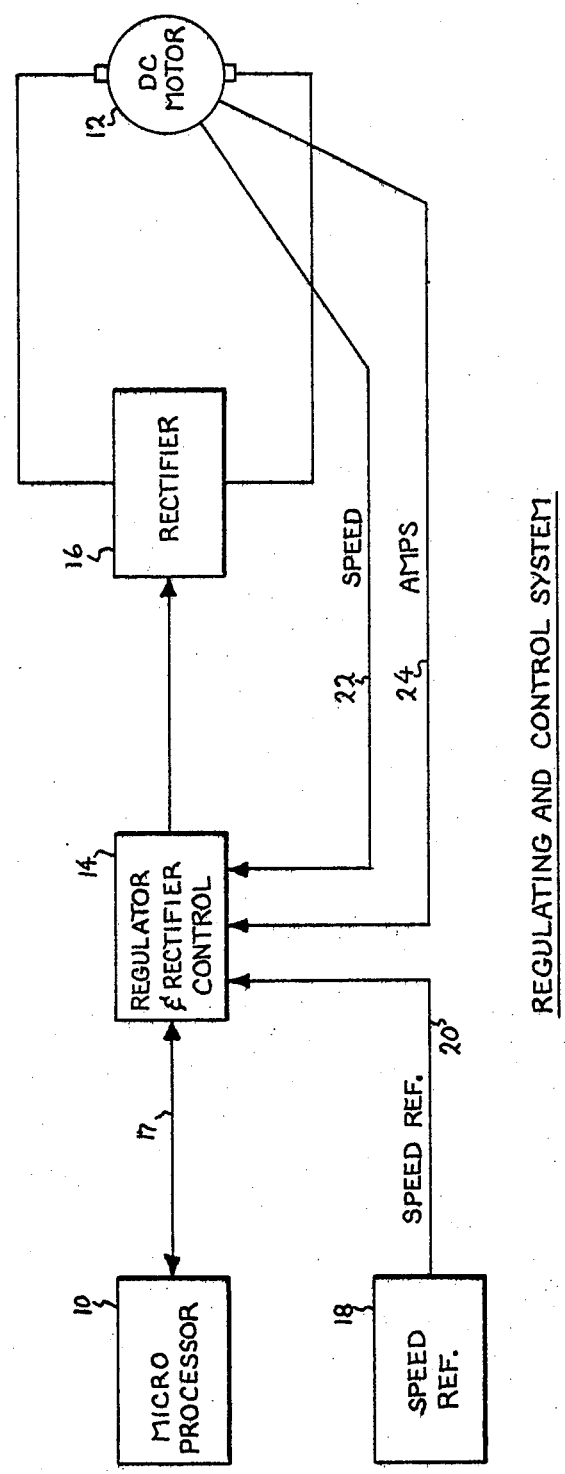
FIG. 1 is a major block diagram of a regulating and control system encompassing the present invention.

In describing the overall operation of the invention, reference is now made to FIG. 1 which illustrates in major block diagram form, the major functional blocks making up the present system. In that figure a data processor shown generally as microprocessor 10 contains a program for controlling the overall operation of the system by reading parameter inputs to the microprocessor from a conventional DC motor 12 via a regulator and rectifier control 14. The program in the processor 10 controls the reading of these various inputs and provides for calculating the firing angle for the proper firing of rectifiers or thyristors commonly referred to as SCR's through a conventional 3-phase bridge rectifier 16. The regulator and rectifier control 14 provides a common interface between the processor 10 and the remainder of the control system. Under control of the processor 10, the control 14 reads input signals from a speed reference 18 via a plurality of input lines, such signals being representative of a digital reference designating the motor speed in revolutions per minute (rpm), of an on/off power state of the motor and of operator signals which are set designating the direction in which the motor 12 is to run. These signals are provided via a plurality of conductors 20 designated Speed Ref. Additional inputs to the processor 10, via the regulator control 14, are Speed signals from the DC motor 12 on a plurality of conductors 22 from a sensor on the motor 12 representative of the speed at which motor is running in rpm. Motor amperes are also measured by the microprocessor via the regulator and rectifier control 14 from current provided to the processor from the motor via a plurality of conductors 24. The regulator and rectifier control 14, under control of signals from the processor 10 provides control signals to a rectifier 16 and receives data from the processor to control the firing of the SCR's in the rectifier at the proper time to control the DC motor. As will subsequently be described, the rectifier 16 is a forward-/reverse bridge which can be enabled to reverse the direction of voltage and current through the motor 12 thus controlling its speed and reversing its direction.

The microprocessor 10 illustrated in FIG. 1 may be any one of a number of general purpose microprogrammed digital computers presently available on the market today. One such computer suitable for application in the present invention is a micro computer sold by the Intel Corporation designated the Intel 8080. Another ideally suited microprocessor, and that which is utilized in practicing the present invention, is a general purpose microcoded digital computer sold by General Electric Company as a model CRD8 Micro Computer System.

Figure 2:
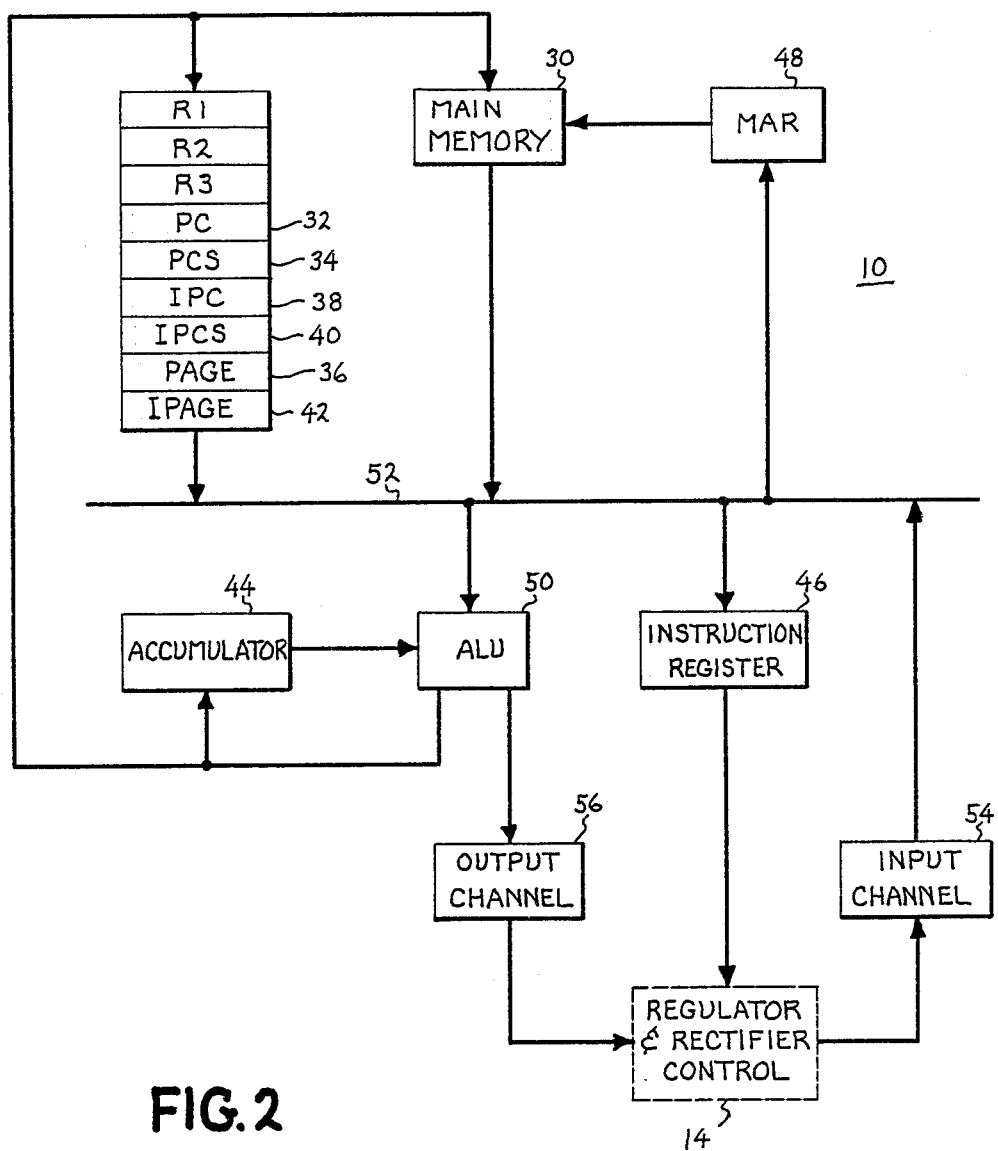
FIG. 2 is a simplified block diagram of a representative data processor for carrying out the invention.

FIG. 2 depicts the main components of a CRD8 microcomputer system. The main control unit of the computer is comprised of a microcode control ROM 26 which is programmed with a microcode consisting of microinstructions stored in the ROM. The microinstructions, designated as enables to register, memory, and 10 channels on a plurality of conductors 28, control the fetching and interpretation of instructions stored in a main memory or store 30 by first recognizing the instruction and then effecting the branching to a sequence of microinstructions in the control ROM which effect the actions called for by the instruction. The address of the next instruction to be interpreted by the microcode ROM is contained in a program counter register (PC) 32. Preceding the interpretation of each instruction, the microcode ROM increments the contents of the program counter PC to point to the following instruction.

The microcode in the microcode ROM interprets subroutine calls by placing the address of the subroutine in a program counter save register (PCS) 34 and then interchanging the rolls of the program counter PC with the program counter save register PCS. Subroutine returns are interpreted by again interchanging the rolls of these latter two registers to thereby cause the instruction following the subroutine call to be interpreted next. When an external interrupt occurs to the processor, the processor interchanges the rolls of the program counter PC 32, the program counter save register PC 34, a page register (Page) 36 with an interrupt program counter 38, an interrupt program counter save register (IPCS) 40, and an interrupt page register (IPAGE) 42. Interrupt returns are interpreted by the microcode in the microcode ROM by interchanging the rolls of these registers back to their original rolls.

External interrupts provided to the processor may be enabled or disabled under program control by setting or resetting an interrupt enable flip flop (not shown). When an external device desired to interrupt the processor, that device puts a request on the interrupt line. If this request is present, the interrupt enable flip flop is set, and the processor is executing an interruptable instruction, the processor will start processing the interrupt at the completion of the current instruction. Once interrupt processing begins, the interrupt program is responsible for notifying the external input device to remove its request from the interrupt line. The memory of the processor is divided into pages with a specified number of words per page. Through the use of the page register 36, an instruction can access data anywhere in the memory by merely specifying an address relative to the head of the current data page (page pointed to by the page register).

Data in main memory 30 can also be accessed directly by loading an address of the data word into one of three general purpose registers designated R1, R2 and R3 respectively. These registers can also be used to store data. The collection of the three general purpose registers and the additional registers 32 through 42 are referred to as scratch pad memory.

In addition to the scratch pad registers, the processor also contains an accumulator 44, an instruction register 46 and a memory address register (MAR) 48, the latter for addressing the main memory 30. During operation of the processor, the instruction register 46 always contains the instruction which the microcode ROM last fetched from main memory and is currently interpreting. The main memory address register 48 always contains the address in main memory that will be accessed by the next memory read or write instruction.

Arithmetic and logical operations are performed by an arithmetic and logical unit (ALU) 50. Input signals to the ALU are provided from the accumulator 44 and from a bidirectional data and control bus 52. Data is transferred within the processor along the bus 52. This bus allows data to be transferred from either main memory 30, a selected scratch pad register, or an input channel 54 to either the instruction register 46, the memory address 48 or the ALU 50. If an input/output instruction is in the instruction register, and if that instruction specifies an output operation is to be performed, the processor places the contents of the ALU 50 on the output data channel via an output channel 56 and notifies the input/output (I/O) device involved to receive the data.

If a read operation is specified, the processor notifies the I/O device involved to place data in the input channel 54. As shown in FIG. 2, the input/output devices involved in the present system are contained in the regulator and control 14 as previously described and duplicated in FIG. 2.

The processor 10 also includes a clock generator designated processor clock 58 which generates a basic clock signal at a representative repetition rate of 4.167 megahertz. As shown in FIG. 2, the basic clock signal is provided to the processor 10 to control the clocking of information and instructions through the processor and also to the system to serve as a basic synchronizing pulse for clocking information into and out of the regulator and rectifier control. While the processor clock 58 was utilized in the present system to provide system clock pulses, it will be appreciated by those in the art that a basic clock signal could likewise be provided from an external source to the processor to serve the same function.

Figure 3:
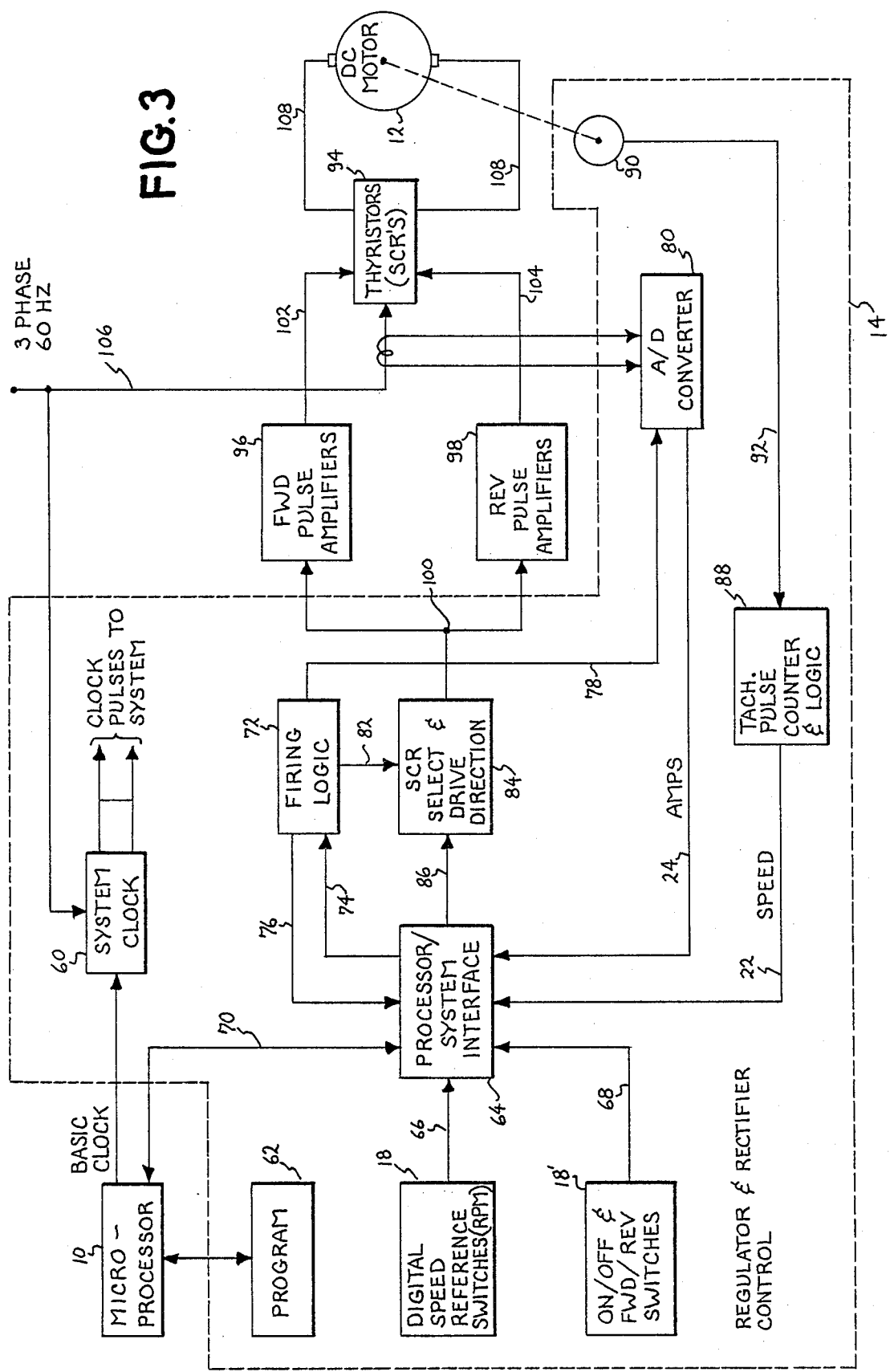
FIG. 3 illustrates in major block diagram form the regulator and rectifier control and rectifier of FIG. 1 as connected to the data processor and load or DC motor.

Reference is now made to FIG. 3 which depicts, largely in major block diagram form, the blocks making up the regulator and rectifier control 14. Additionally, for clarity and simplification purposes in FIG. 3, various ones of the components previously described in connection with FIGS. 1 and 2 are illustrated wherein like numbers are attached to those components as previously described. As illustrated, the processor 10 provides the basic clock signals to a system clock 60 in the regulator control 14. The system clock 60 also receives a 3-phase 60 hertz power line signal from an external power source, not shown, and provides clock pulses to the system for use in synchronizing overall system operation with the 3-phase 60 hertz power line for controlling the firing of the SCR's to control the motor 12.

The regulator in control 14 also includes, as a part thereof, a program 62 which communicates with the processor 10 to control the operation of the regulator in control 14 to ultimately provide the proper firing pulses to the thyristors or SCR's to control the DC motor. While the program 62 may be contained in the main memory 30 of FIG. 2, it is to be understood that the program 62 is considered a part of the regulator and rectifier control since it performs the specified logic functions essential to the operation of the overall control of the system.

Still referring to FIG. 3, the previously mentioned speed reference 18 is shown as digital switches (rpm) and on/off and fwd/rev switches 18' all serving as inputs to the processor 10 via a processor/system interface 64. A digital speed reference representative of the desired motor speed (in rpm) is provided from the switches 18 via a plurality of conductors 66 and is read into the processor and stored in the main memory or program 62 under control of the processor. In a similar fashion, signals representative of the motor on/off switch and a switch representative of the desired forward or reverse direction of the motor are provided to the processor from the on/off and fwd/rev switches to 18' via the processor system interface 64 on conductors 68. Communication between the processor 10 and the processor system interface 64 is via a plurality of conductors 70 comprised of data input/output lines and control lines. As will subsequently be described, clock pulses from the system clock 60 are also provided over these lines to the processor during the operation of the system.

A firing logic 72 is employed in the regulator and control 14 to receive information representative of a desired firing angle, for firing the SCR's to control the motor. This information is provided from the microprocessor via the processor system interface 64 on conductors 74. The firing logic 72 issues, basically, three signals. The first is an interrupt signal on a conductor 76 to the processor 10. The interrupt signal can either circumvent or go through the interface 64. Another one of these signals is a convert signal on a conductor 78 to an analog/digital converter 80 to trigger that converter to convert the 3-phase analog motor current to a count proportional to DC amperes for transmission to the processor via conductor 24 and the interface 64. Additionally, the firing logic 72 generates a firing pulse on a conductor 82 to an SCR select and drive direction logic 84.

The SCR select and drive logic 84 receives digital information from the processor 10 via the interface 64 on a plurality of conductors 86. This information is representative of words or addresses to cause the proper selection of the thyristors to be fired and to select a particular one of two bridges (forward or reverse) in the rectifier 16 to control the motor direction. The operation of the firing logic and the SCR select and drive direction logic will subsequently be described.

The aforementioned speed signals on conductors 22 are provided from a tach pulse counter and logic 88 which receives pulses from a conventional digital tachometer 90. A particular tachometer suitable for use in the present invention is available from the Avtron Corporation as a model K827. This tachometer generator is an optical device employing two rotating discs with slots which cause 1200 pulses per motor revolution to be generated by each of the discs. The output signal from each of the discs is essentially a square wave with 1200 counts per tachometer shaft revolution. These pulses from the two discs are displaced by a 90° phase relationship so that motor direction can be detected by detecting the displacement of the phases of the pulses provided from the tachometer on conductors 92 to the tach pulse counter 88. The manner of detection will be subsequently described in connection with the description of the tach pulse counter logic 88.

The aforementioned rectifier 16 of FIG. 1, as shown in FIG. 3, is comprised of a block 94 designated thyristors (SCR's) 94 and forward (fwd) and reverse (rev) pulse amplifiers 96 and 98 respectively. SCR select and drive direction signals are provided to the amplifiers 96 and 98 via a plurality of conductors 100 from the SCR select and drive direction 84. During the operation of the system, address information loaded into the SCR select and drive direction from the microprocessor causes the proper one of the forward or reverse amplifiers 96 and 98 to be selected to apply a firing pulse to the thyristors 94 when the firing logic generates the firing pulse on conductor 82. The output firing pulses from the forward and reverse pulse amplifiers 96 and 98 are provided to the SCR's 94 via conductors 102 and 104 respectively. The power to drive the SCR's and thus the DC motor 12 is provided via a 3-phase 60 hertz power line 106 to the SCR's 94. When the SCR's are fired, pulses are provided via conductors 108 to apply current to the DC motor 12 to drive the motor.

Figure 4:
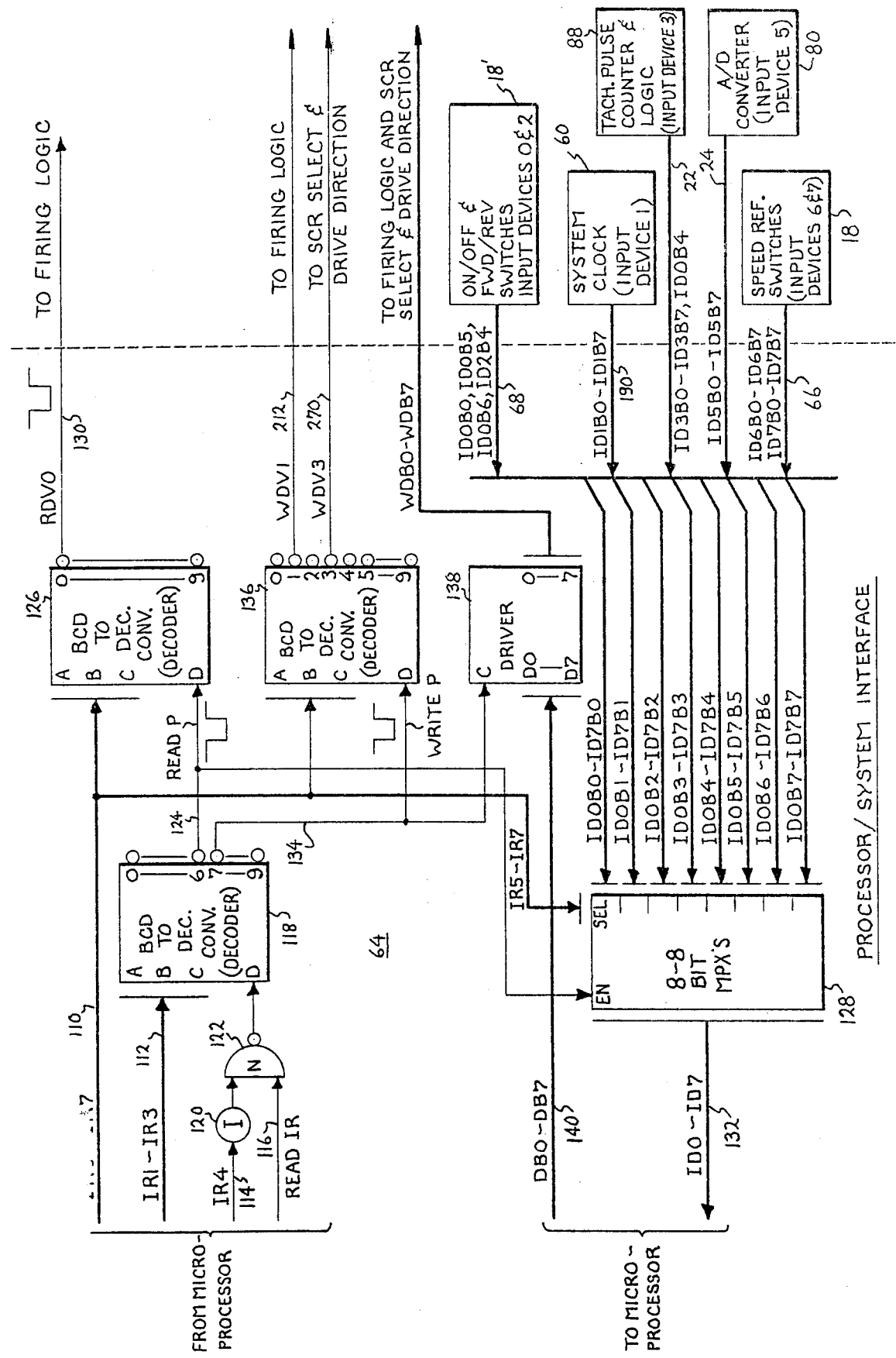
FIG. 4 is a detailed logic diagram of the processor/system interface of FIG. 3 showing its interconnection between the data processor and the other logic blocks of the regulator and rectifier control.

An overall understanding of the operation of the present invention can best be had by a detailed description of each of those logic blocks previously described in the regulator and rectifier control 14 of FIG. 3. The first of these blocks to be described is the processor system interface as depicted by FIG. 4. As shown in the left hand portion of FIG. 4, all of the input and output signal lines to the processor system interface shown to the left of the dashed lines collectively comprise the conductors 70 as previously described in connection with FIG. 3. All information transferred from the processor 10 into the system interface 64 comes from the output channel 56 as previously described in connection with FIG. 2. Basically, the processor 10 transfers two types of commands or instructions to the system interface. These instructions will direct the system interface to either write certain data from the processor into specified registers in the system, such as the firing logic and SCR direction logic, or to read information from various ones of the addressed input devices shown in the right hand portion of FIG. 4.

Instruction data is provided to the system interface from the output channel 56 of the processor via conductors 110, 112, 114, and 116. The signals on conductors 112, 110 and 114 are representative of instruction register bits from the processor 10. When the processor issues a read command to the system interface, instruction register bits IR1 through IR3 on conductors 112 are decoded in a binary coded decimal (BCD) to decimal converter serving as a decoder to generate a read pulse designated READ from an output terminal 6 of decoder 118. The read pulse is generated whenever the instruction register bit IR4 (conductor 114) is a binary zero and converted to a binary 1 through an inverter 120 to enable a NOR gate 122 when a binary 1 READ instruction register (IR) signal is issued by the processor. When gate 122 is enabled its output applies a binary 0 clock pulse to a D input terminal of decoder 118, thus generating a READ pulse on conductor 124. The read pulse is applied to two logic elements in the interface. Application is firstly to a D input terminal of a second BCD to decimal converter serving as a decoder 126 and secondly to an enable (EN) input terminal of an eight bit multiplexer 128.

The decoder 126 and multiplexer 128 receive, on conductor 110, the instruction register bits IR5 through IR7. When these bits are decoded by decoder 126 as a read device zero command, the decoder generates an RDV0 signal at its zero output terminal on a conductor 130 as shown in FIG. 4. The RDV0 signal is provided to the firing logic 72 for purposes to be be subsequently be described. Further, whenever a READ command is issued by the processor, the instruction register bits IR5 through IR7, applied to an SEL input of the multiplexer 128, are decoded to route the data from one of the input devices on the right hand portion of FIG. 4 to the data processor via a common time-shared bus 132 carrying input information designated ID0-ID7 to the input channel 54 of the processor 10 (see FIG. 2).

Whenever the processor issues a write command, the instruction is decoded in decoder 118, in the manner as previously described for the READ pulse, to generate a write pulse at an output terminal 7 on a conductor 134. The write pulse on conductor 134 is applied to decoder 136 and logic driver 138. The decoder 136 also receives the instruction register bits IR5 through IR7 on conductors 110 to thus decode those bits to generate one of two output signals (WDV1 or WDV3) in accordance with the IR5-IR7 binary bit configuration. These latter two signals, carrying the designations WDV1, WDV3 for write device, are provided to the firing logic and to the SCR select and drive direction logic, the purpose of which will subsequently be described. A write pulse applied to a C or clock input terminal of driver 138 allows data on a plurality of conductors 140 to be clocked from the processor output channel 56 to the firing logic and the SCR select and drive direction logic as signals WDB0-WDB7.

Reference is now made to the input device blocks 18, 60, 80 and 88 in the right hand portion of FIG. 4. It will be noted that each of those devices is designated as having a unique input device number, such as input device 1 for the system clock 60. These device numbers correspond to the address of that particular device as presented to the system interface by the processor when it is desired to read information through the multiplexer 128 into the processor from any one of the devices. For example, if the data processor issues a read command to generate a read pulse on conductor 124, with an address on conductors 110 specifying the address for device 1, the system clock input data bits ID1B0 through ID1B7 will be channelled through the multiplexer 128 onto the input data bus 132 and transferred into the data processor memory. All input data transfers to the processor from the input devices are handled in the manner as just described for the system clock 60, with the exception that the specific address provided to the 8 bit multiplexer 128 will channel the information into the processor from the addressed device.

Figure 5:
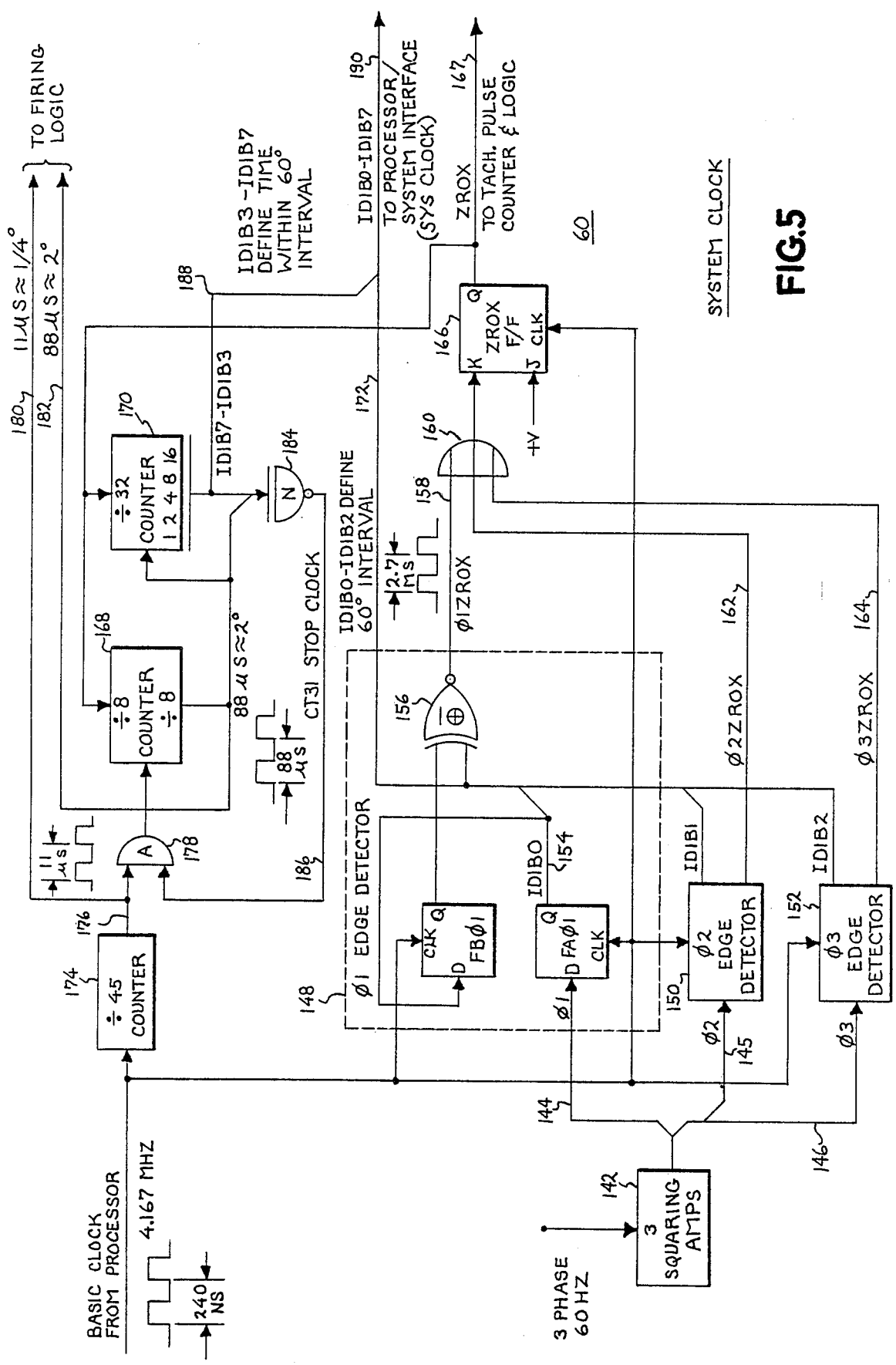
FIG. 5 is a detailed logic diagram of the system block of FIG. 3.
Figure 6:
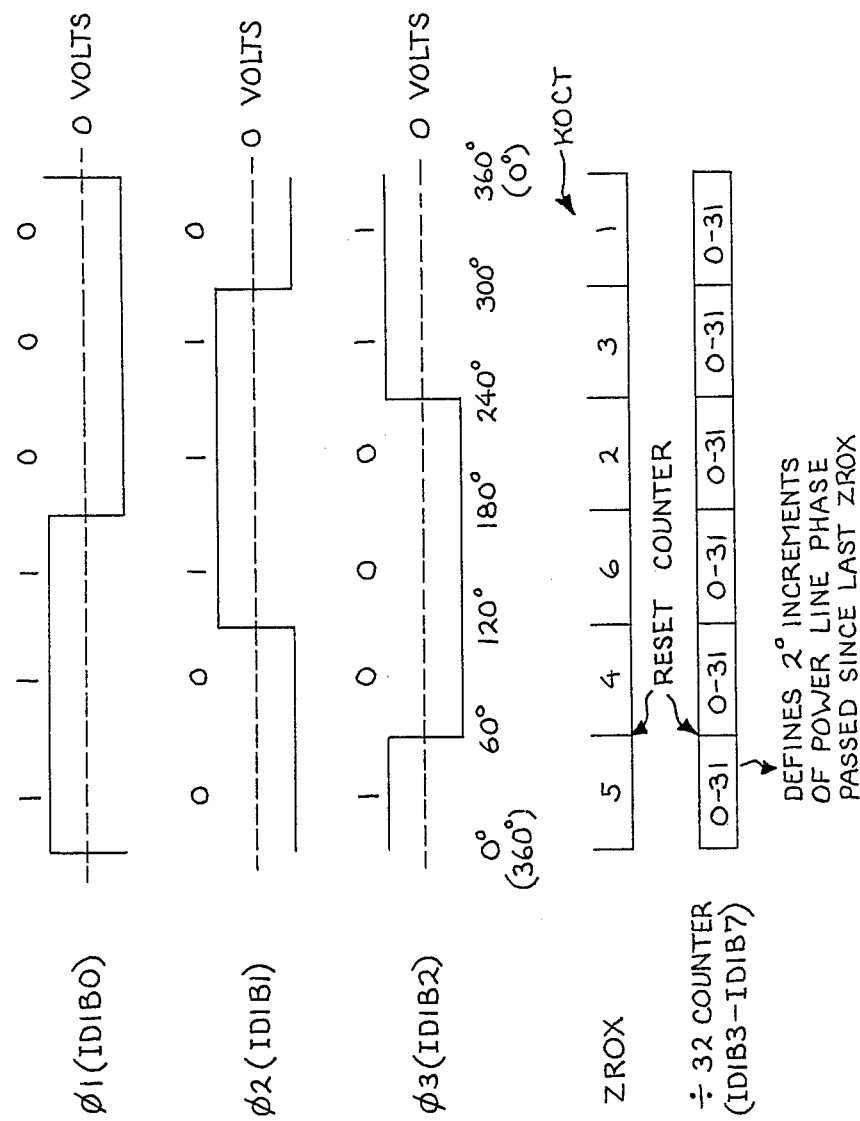
FIG. 6 is a timing diagram useful in the understanding of the operation of the system clock and the regulating and control system of the present invention.

Reference is now made to FIGS. 5 and 6. FIG. 5 is a detailed block diagram of the system clock 60 (device 1) FIG. 6 is a timing diagram helpful in understanding the operation of the system clock. The 3-phase system power line voltage is applied to three conventional squaring amplifiers 142, generating corresponding square wave output signals designated $\phi1$, $\phi2$, and $\phi3$ on conductors 144, 145 and 146 respectively. The three signals, $\phi1$ through $\phi3$, are applied to the respective "D" inputs of conventional D type flip-flops of three similar phase zero crossing logic or edge detectors 148, 150 and 152. Since the edge detectors 148 through 152 are similar, only edge detector 148 is shown in detail in FIG. 5.

Each of the edge detectors function in the following manner, as will be described for edge detector 148. When the $\phi1$ signal on conductor 144 goes positive, the D input terminal of a FA$\phi1$ flip-flop is enabled to achieve a set state upon the application of the basic clock signal from the processor to a CLK input terminal of that flip-flop. When the basic clock signal goes positive, the FA$\phi1$ flip-flop is set causing its Q output terminal to go to a binary 1 state to thus generate an ID1B0 signal on conductor 154. The ID1B0 signal is applied as one input to a negative exclusive or gate 156 and as an input to a D Terminal of a second flip-flop FB$\phi1$. Upon the occurrence of the next basic clock signal, the FB$\phi1$ flip-flop will achieve a set state causing its Q output terminal to go to a binary 1, thus causing the exclusive OR gate 156 to generate an output pulse $\phi1$ZROX on a conductor 158, as shown in FIG. 5. The FA$\phi1$ and FB$\phi1$ flip-flops form essentially, a two-bit shift register whose outputs are supplied to the gate 156. The FA$\phi1$ output synchronizes the square wave from the $\phi1$ input to the system clock. Thus, it can be seen that the output $\phi1$ZROX of the exclusive OR gate 156 will produce one pulse at the basic clock pulse width each time the input sine wave goes through zero crossing at approximately every 2.7 millisecond period. The $\phi1$ZROX signal is connected to the input of an OR gate 160 in conjunction with signals $\phi2$ZROX and $\phi3$ZROX from the corresponding edge detectors 150 and 152 on conductors 162 and 164 respectively. Each of the signals $\phi1$ZROX through $\phi3$ZROX correspond to phases A, B, and C of the input line voltage.

The output of OR gate 160 is applied to a K input terminal of a ZROX JK flip-flop 166. Flip-flop 166 also receives, at a CLK input terminal, the basic clock signal to trigger that flip-flop to cause it to set or reset in accordance with the state of the input signal applied to its K terminal from OR gate 160. The ZROX flip-flop generates a ZROX, or zero crossing signal at its Q output terminal which is applied to the tach pulse counter and logic and two two counters, 168 and 170. By referring to the timing diagram of FIG. 6, it can be seen that the ZROX flip-flop 166 produces the ZROX signal having a pulse 1 basic clock width wide for each phase voltage crossing of the input voltage, or 6 pulses for 360 degrees of power-line voltage cycle.

Referring now to FIGS. 5 and 6, it can be seen that the three signals, ID1B0 through ID1B2 (combined to form conductors 172) can be utilized by the data processor to define any 60° interval within a 360° phase cycle of the input line voltage. This is illustrated in FIG. 6 by referring to the $\phi3$ (ID1B2) square wave showing the various degrees of the input sine wave and the various zero crossings at the 60° intervals. As can be seen by the interrelationships between the ID1B0 through ID1B2 signals, it is a relatively easy matter to decode those signals to define which interval of six intervals in a 360° cycle is present at any given time. For example, assuming that the first interval is from zero to 60°, when ID1B0 is a binary 1, ID1B1 is a binary zero, and ID1B2 is a binary 1, and by decoding those three binary bits it can be designated as the first interval of the 360° cycle. A similar decoding can be performed for the 60° to 120° intervals, the 120° to 180° intervals etc.

Referring now again to FIG. 5, there is shown the two previously mentioned counters 168 and 170 in conjunction with a divide by 45 Counter 174. The 4.167 megahertz basic clock is applied to the input of the divide by 45 counter 174, which divides the basic clock pulses down to produce an 11 microsecond pulse duration signal on a conductor 176. As shown in FIG. 5, the 11 microsecond pulse on conductor 176 is applied to an AND gate 178 and also to the firing logic on a conductor 180. Further, as indicated on conductor 180, the 11 microsecond pulse is approximately equal to one quarter of an electrical degree of the power line voltage applied to the squaring amplifiers 142. The 11 microsecond pulses are applied, via AND gate 178, to a divide by 8 counter 168 to produce an 88 microsecond time base, the pulses each of which correspond to approximately 2 electrical degrees of the power line voltage. The 88 microsecond pulse is applied via conductor 182 to the firing logic, to a NOR gate 184, and to counter 170. Counter 170 is a divide by 32 counter and further divides the 88 microsecond pulses by 32. So long as counter 170 is not at a count of 31, NOR gate 184 applies a CT31 stop clock binary 1 signal on conductor 186 as a second input to AND gate 178 to allow the 11 microsecond pulses to pass through that gate to counter 168. When counter 170 reaches a count of 31, in conjunction with a binary 1 (88 microsecond) pulse, NRD gate 184 is enabled to apply a binary zero inhibit signal to gate 178, thus inhibiting the counters, 168 and 170 from counting beyond 31. The counter comprised of counters 168 and 170, will remain at a count of 31 until the next zero crossing or Z ROX signal is generated from flip-flop 166 to reset the counters to zero as shown by the timing relationships in FIG. 6. Thus, it can be seen that the counter will count from zero to 31 between each zero crossing of the input voltage. It will be noted, that the output signals ID1B7 through ID1B3 from counter 170 on conductors 188 define the time within the 60° interval as defined by the signal ID1B0 through ID1B2. The ID1B3 through ID1B7 signal conductors are combined with the ID1B0 through ID1B2 signal conductors to form conductors 190 for application to the processor system interface 8 bit multiplexer 128 shown in FIG. 4.

It can now be seen that when the processor 10 reads the system clock it can determine the 60° interval of a 360° cycle of the input wave by looking at bits ID1B0 through ID1B2 while simultaneously determining the number of 2° increments (88 microsecond pulses) of the power line phase voltage which have passed since the last zero crossing (ZROX).

Figure 7:
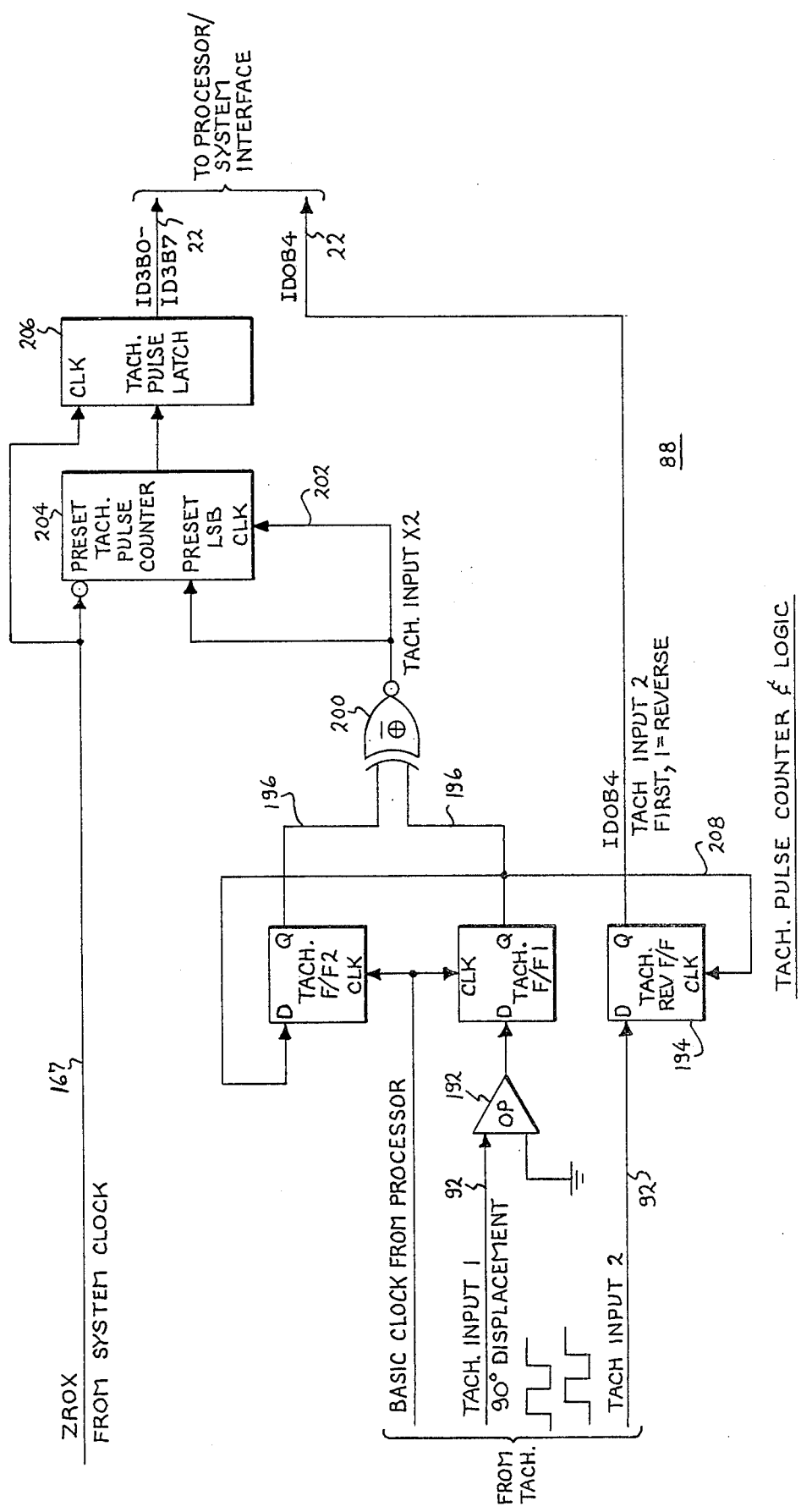
FIG. 7 is a detailed logic diagram of the tach pulse counter and logic of FIG. 3.
Figure 8:
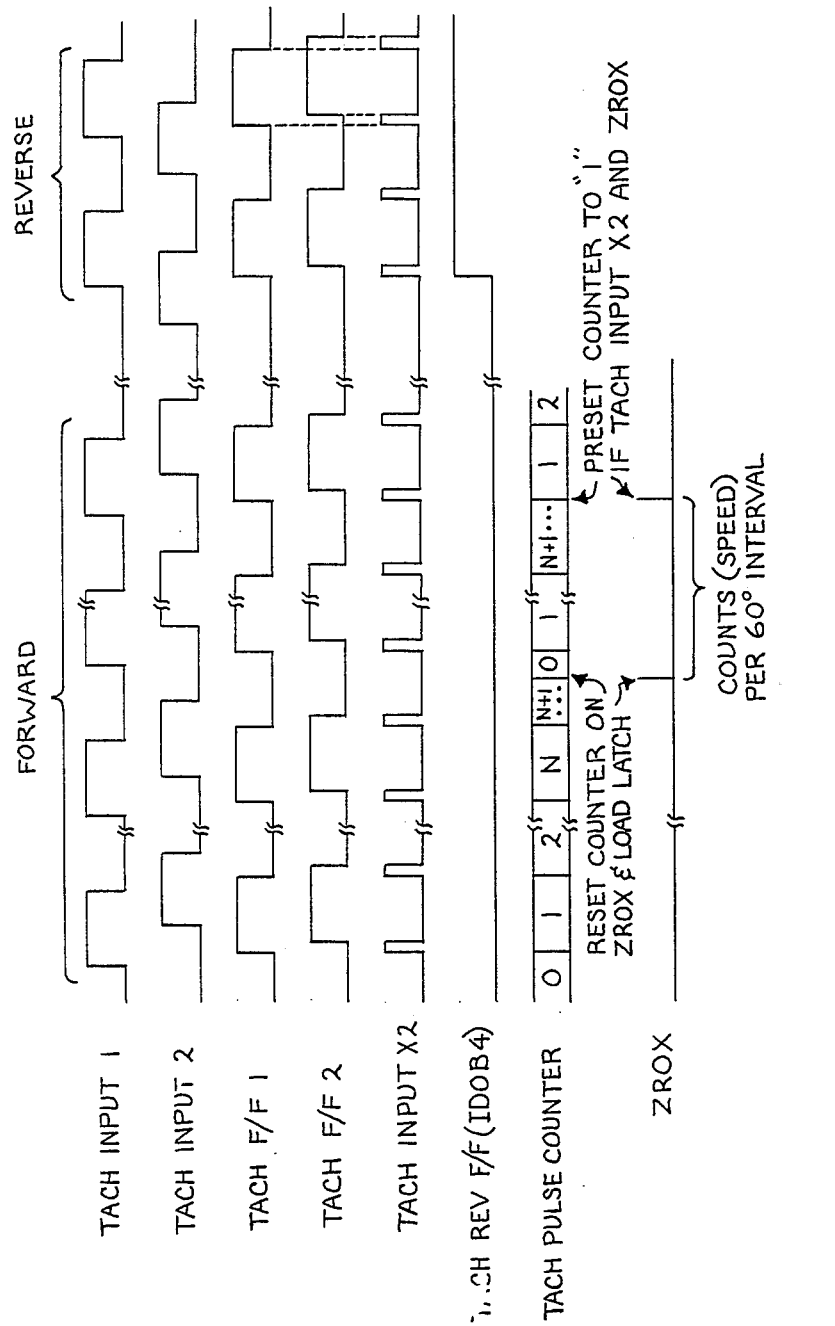
FIG. 8 is a timing diagram useful in understanding the operation of the tach pulse counter and logic of FIG. 7.

Reference is now made to FIG.'S 7 and 8. FIG. 7 is a detailed block diagram of the tach pulse counter and logic, and FIG. 8 is a timing diagram helpful in understanding the operation of that logic. As previously described in connection with FIG. 3, the tachometer used in the present embodiment generates two square wave output signals with each output signal generating 1200 counts per tachometer shaft revolution. These two signals are applied on conductors 92, as shown in FIG. 7, as two input signals; TACH a Input 1 is applied to an operational amplifier 192 and a TACH Input 2 signal is applied to a D input terminal of a tach rev flip-flop 194. Referring to FIG. 8, the timing relationships showing the 90° phase displacement between the TACH Input 1 and TACH Input 2 signals is shown. The TACH Input 1 signal is applied, via amplifier 192, to a D input terminal of a type D edge-triggered tack flip-flop F/F1 which also receives at its CLK terminal the basic clock signal from the processor. As shown in FIG. 8, tack flip-flop F/F1 merely toggles from the set to reset state in accordance with the state of the TACH Input 1 signal each time the basic clock signal from the processor triggers that flip-flop. The tach F/F1 has its Q output terminal connected to the D input terminal of a second flip-flop designated tach F/F2 which also receives the basic clock at a CLK input terminal. These two flip-flops essentially constitute a two bit shift register which functions in a manner similar to that previously described for the edge detector flip-flops of FIG. 5 in the system clock. The output of the tach flip-flops F/F1 F/F2 are applied via conductors 196 and to a negative exclusive OR gate 200. The OR gate effectively differentiates the TACH input 1 pulse, applied via conductors 196 to produce one pulse at a clock width of the basic clock for each transition of the TACH 1 Input signal. Since the TACH Input 1 signal produces 1200 pulses per revolution of a tachometer shaft, the output of the exclusive OR gate 200 will produce 2400 pulses per revolution of the tachometer shaft generating a Tach Input X 2 signal as shown on conductor 202 and illustrated in FIG. 8.

The TACH Input X 2 signal, on conductor 202, is applied to a CLK input terminal of tach pulse counter 204 to cause the counter to accumulate the tach pulses read from the tachometer. The Tach Input X 2 signal is also applied to a preset LSB input terminal of counter 204, the purpose of which will be subsequently described. It will be noted that the ZROX signal from the system clock is also applied to a present input terminal of counter 204 and also to a CLK input terminal of a tach pulse latch 206. It will be recalled from the previous description of the system clock, that whenever one of the input phase voltages passes through zero to neutral crossing that a ZROX signal is generated. Thus, it can be seen that the tach counter 204 is reset to a binary zero state whenever a zero crossing pulse occurs. As such, it is evident that the tach pulse counter 204 accumulates counts representative of motor revolutions per each 60° interval of 60 cycle input.

As shown in FIG. 8, the tach pulse counter 204 is always reset to a zero state upon the occurrence of the ZROX signal. It is also significant to note, as illustrated in FIGS. 7 and 8 that the contents of the tach pulse counter 204 are transferred to the tach pulse latch 206 upon the occurrence of the ZROX signal. Though not illustrated in FIGS. 6 and 7, it is to be understood that the contents of the tach pulse counter are transferred into the tach pulse latch on the leading edge of the ZROX signal and then the tach pulse counter is reset on the trailing edge of that signal.

Reference is now made back to the present LSB input terminal of counter 204. The purpose of applying the Tach Input X 2 signal to this latter terminal, is to preset the least significant bit of the tach pulse counter to a binary 1 in the event that a tach pulse occurs at a time of the ZROX signal or zero crossing. Should there be a simultaneous occurrence of the ZROX signal, and a Tach Input X 2 signal, the presetting of the least significant bit assures that any count that occurs during the zero crossing is not ignored, but is instead recorded in the tachometer pulse counter. Once the contents of the tach pulse counter are loaded into the tach pulse latch 206, that information in the form of signals ID3B0 through ID3B7 is available on conductors 22 for the processor to read the motor revolutions per 60° when the processor addresses Device 3.

Also shown in FIGS. 7 and 8 is logic for detecting the direction of motor rotation. The direction of motor rotation is detected by a tach rev flip-flop 194 receiving the Tach input 2 signal at its D input terminal. The operation of flip-flop 194, is shown in FIG. 8, which illustrates the operation of that flip-flop when the motor is running in both the forward and reverse directions. It will be noted, that when the motor is running in the forward direction, the TACH Input 1 signal always preceeds the TACH Input 2 signal by 90°. As shown in FIG. 8, when the motor is running in the forward direction, the tach rev flip-flop 194 will never achieve the set state due to the fact that the TACH Input 1 signal which triggers the flip-flop 194 via conductor 208, always goes set, prior to the TACH Input signal ever achieving a binary 1 state. Thus, the edge triggered flip-flop 194 will never set. In the reverse direction, however, referring to the right-hand side of FIG. 8, it will be noted that when the TACH Input 2 signal preceeds the TACH Input 1 signal by 90°, the tach rev flip-flop 194 will achieve a set state when the tach flip-flop 1 achieves a set state. When the rev flip-flop achieves a set state its Q output terminal generates a binary 1 ID0B4 signal on one of the conductors 22 to the processor system interface. When the TACH Input 2 signal preceeds the TACH Input 1 signal, the binary 1 signal of ID0B4 notifies the data processor that the motor is running in a reverse direction.

Figure 9:
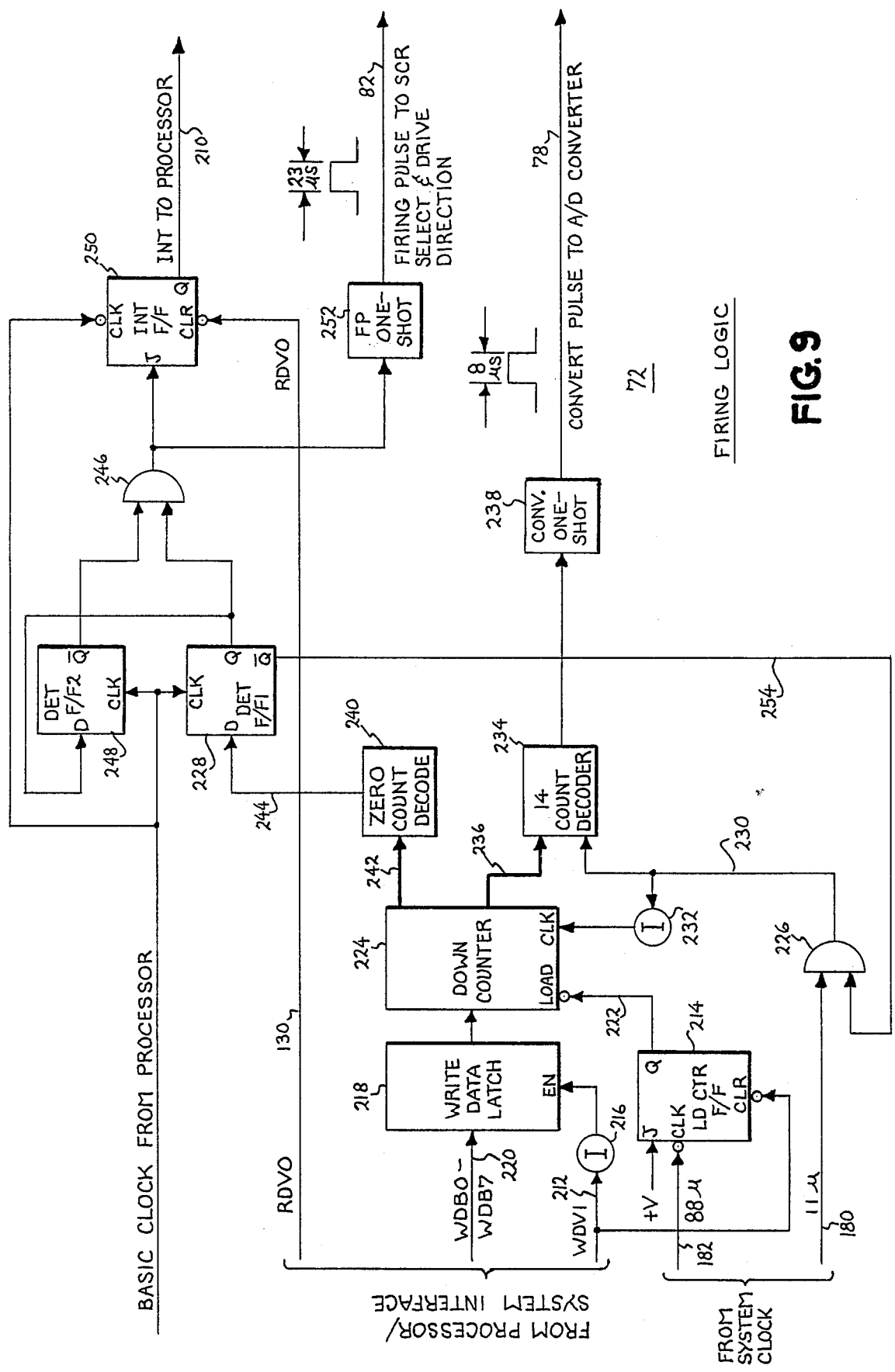
FIG. 9 is a detailed logic diagram of the firing logic of FIG. 3.
Figure 10:
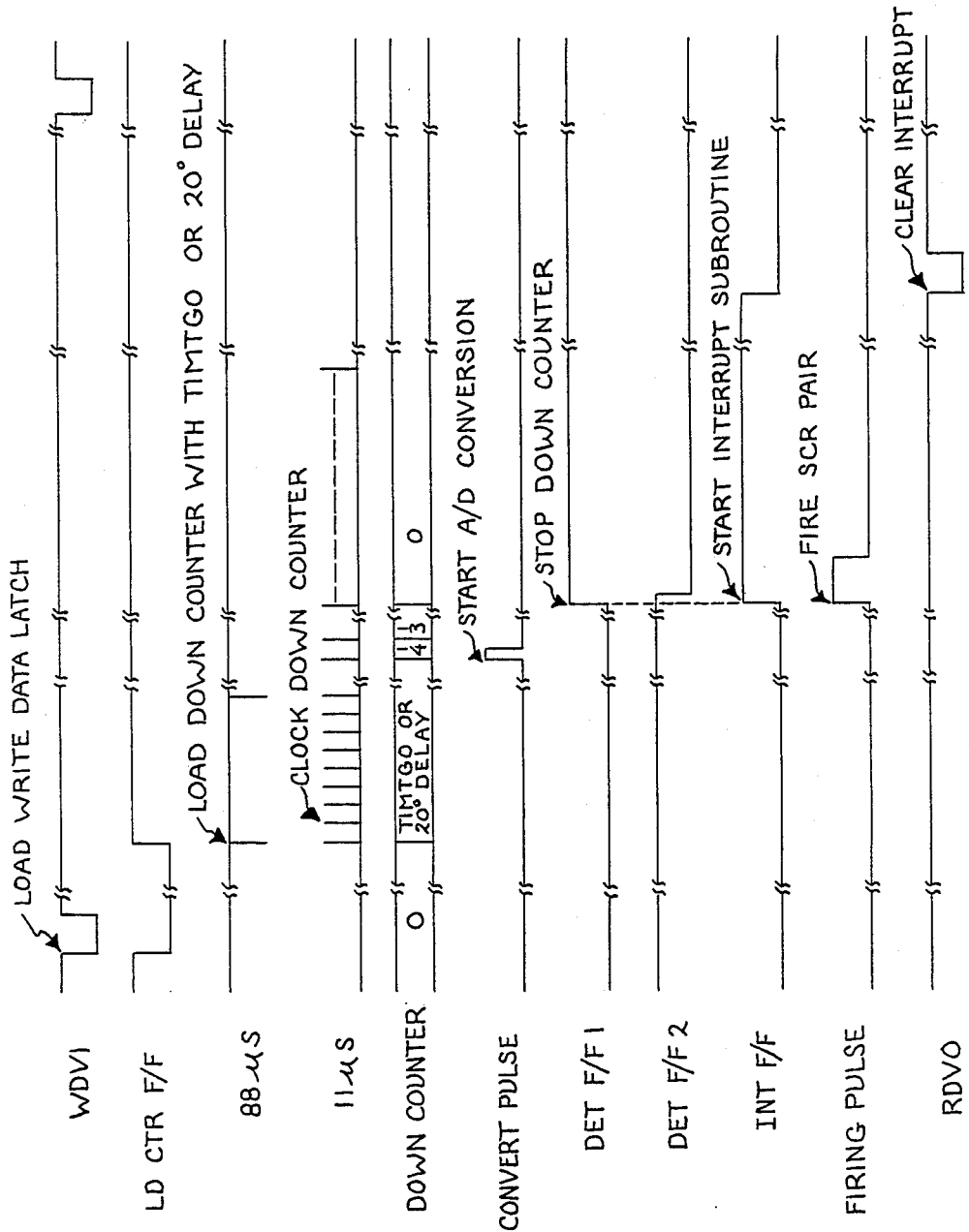
FIG. 10 is a timing diagram illustrating the timing of the firing logic of FIG. 9 and is helpful in understanding the operation of the present invention.

Reference is now made to the firing logic of FIG. 9, which illustrates that logic in block diagram detail. FIG. 10 should also be reference in conjunction FIG. 9. FIG. 10 is a timing diagram showing the timing interrelationships between the various signals within the firing logic 72. As previously described, the primary purpose of the firing logic is to provide a firing pulse on conductor 82 to the SCR select and drive direction logic 84, as shown in FIG. 3. Additionally, the firing logic generates a convert pulse to the A to D converter on conductor 78. It is through the operation of the firing logic, that the processor is signalled from an interrupt signal on a conductor 210 of FIG. 9 to begin the process of calculating the firing angle for generation of the firing pulse to fire an SCR at the proper time.

In describing the operation of the firing logic, reference is also made at this time, to FIG. 4. It will be recalled from the previous description that the processor must generate a write command and a device address to send a command to that device. For the firing logic, the decoder 136 generates a write device 1 (WDV1) signal as shown in FIGS. 4 and 10. As shown in FIG. 10, when WDV1 signal goes from a binary 1 to a binary zero state, the WDV1 signal on conductor 212 causes a load counter flip-flop 214 (FIG. 9) to receive the binary zero signal at a CLR input terminal causing that flip-flop to reset. Simultaneously, the WDV1 signal is inverted through an inverter 216 to a binary 1, applying an enable signal to an EN input terminal of a write data latch 218, thus loading the data (WDB0-WDB7) on conductors 220 from the drivers 138 of FIG. 4.

Referring now to FIGS. 9 and 10, it will be noted that the occurrence of the first 88 microsecond pulse appearing on conductor 182 after the WDV1 signal clocks the load counter flip-flop 214, causing that counter to achieve a set state generating a binary 1 signal at its Q output terminal on a conductor 222. The binary 1 signal on conductor 222 is applied to an inverter input load terminal of a down counter 224. As shown in FIG. 10, the load counter flip-flop, when in the set state and in conjunction with the 88 microsecond pulse, loads the down counter 224 with either a TIMTGO or 20 second delay signal. The TIMTGO signal is a binary configuration of bits loaded into the down counter from the data processor, representative of or proportional to the firing angle of the SCR's. If a TIMTGO signal is not loaded into the down counter, then a data word representative of a 20° delay is loaded. A more detailed description of the purpose of the TIMTGO and 20 degree delay signals or values will be made subsequently.

Reference is now made back to FIG. 9 to an And gate 226. And gate 226 is enabled by a binary 1 output from a Q output terminal of a first detector flip-flop 228. With flip-flop 228 in the reset state, the first 11 microsecond pulse on conductor 180, applied to gate 226, causes the contents of counter 224 to be clocked or counted via conductor 230 and an inverter 232 applying the 11 microsecond pulse to a CLK terminal of the down counter. The timing for the clocking of the down counter 224 is shown on the 11 microsecond line and on the down counter line of FIG. 10. The down counter will continue to count down to a specified value until a 14 count decoder 234 recognizes a count of 14 via a plurality of conductors 236 from the counter. At a count of 14, and with an 11 microsecond pulse from gate 226, decoder 234 generates a pulse to fire a convert one-shot multivibrator 238. One-shot 238 generates an 8 microsecond convert pulse on conductor 78 which is applied to the analog digital converter 80 of FIG. 3 at the time illustrated in FIG. 10. This pulse starts the analog digital converter to perform an A to D conversion of motor current on conductors 24 for subsequent use by the processor.

The down counter will continue to count down to a specified value of zero as shown in FIG. 10. When the down counter gets to the count of zero, as detected by a zero count decode 240 via conductors 242 from the down counter, the zero count decode 240 generates a pulse on a conductor 244 which is applied to a D terminal of the detector flip-flop 1, 228. Upon the appearance of the next basic clock signal applied to the CLK terminal of flip-flop 228, that flip-flop will set causing a binary zero signal to now be applied to And gate 226 to inhibit the 11 microsecond clock pulses being fed to the down counter 224. This is shown by the note, "Stop Down Counter" in FIG. 10. When the detector flip-flop 228 goes to a set state, its Q output terminal goes a binary 1 to simultaneously enable one input to an And gate 246 and apply a binary 1 set signal to a D terminal of a second detector flip-flop 248. It will be noted as shown in FIG. 10, that And gate 246 is enabled at the instant flip-flop 228 goes into the set state, due to the fact that flip-flop is reset at that time. The output of And gate 246 now applies a trigger signal to a J input terminal of an interrupt flip-flop 250 effecting the generation of the interrupt signal to the data processor. The interrupt signal causes the data processor to go into an interrupt subroutine to start calculations of the firing angle for subsequent firing of the SCR's.

It will be noted, that the first basic clock signal, following the setting of flip-flop 228, will set flip-flop 248, causing the $\overline{Q}$ output terminal to go to a binary zero thus disabling And gate 246. This causes the generation of a short pulse to be applied to the INT flip-flop 250 as indicated by the overlap between the DET FF1 and DET FF2 signals in FIG. 10. It is also to be noted, that simultaneously with the setting of the interrupt flip-flop 250, that the output signal from And gate 246 is applied to a firing pulse (FP) one-shot multivibrator 252 to apply a 23 microsecond firing pulse on conductor 82 to the SCR select and drive direction logic 84. The generation of the firing pulse is shown in FIG. 10, at which time an SCR pair is fired simultaneously with the generators of the interrupt signal. The firing logic will remain in the present or preset state until receipt of another WDV1 signal on conductor 212 causes a loading of new data into the down counter 224 in the manner just described.

When the down counter is loaded with new data, the zero count decode now applies a reset signal on conductor 244 to flip-flop 228, allowing that flip-flop to now achieve a reset state and simultaneously reset flip-flop 248. When flip-flop 228 resets its $\overline{Q}$ output signal on conductor 254 goes to a binary 1, now enabling And gate 226 to allow counter 224 to count after it is loaded. As shown in FIG. 10, at some time subsequent to the firing of the SCR pair, the data processor must send a RDVO (read device zero) signal on conductor 130 to a clear CLR input terminal of the interrupt flip-flop 250 to reset that flip-flop in preparation to sending another interrupt to the processor immediately upon the generation of a firing pulse to the SCR's.

Figure 11A:
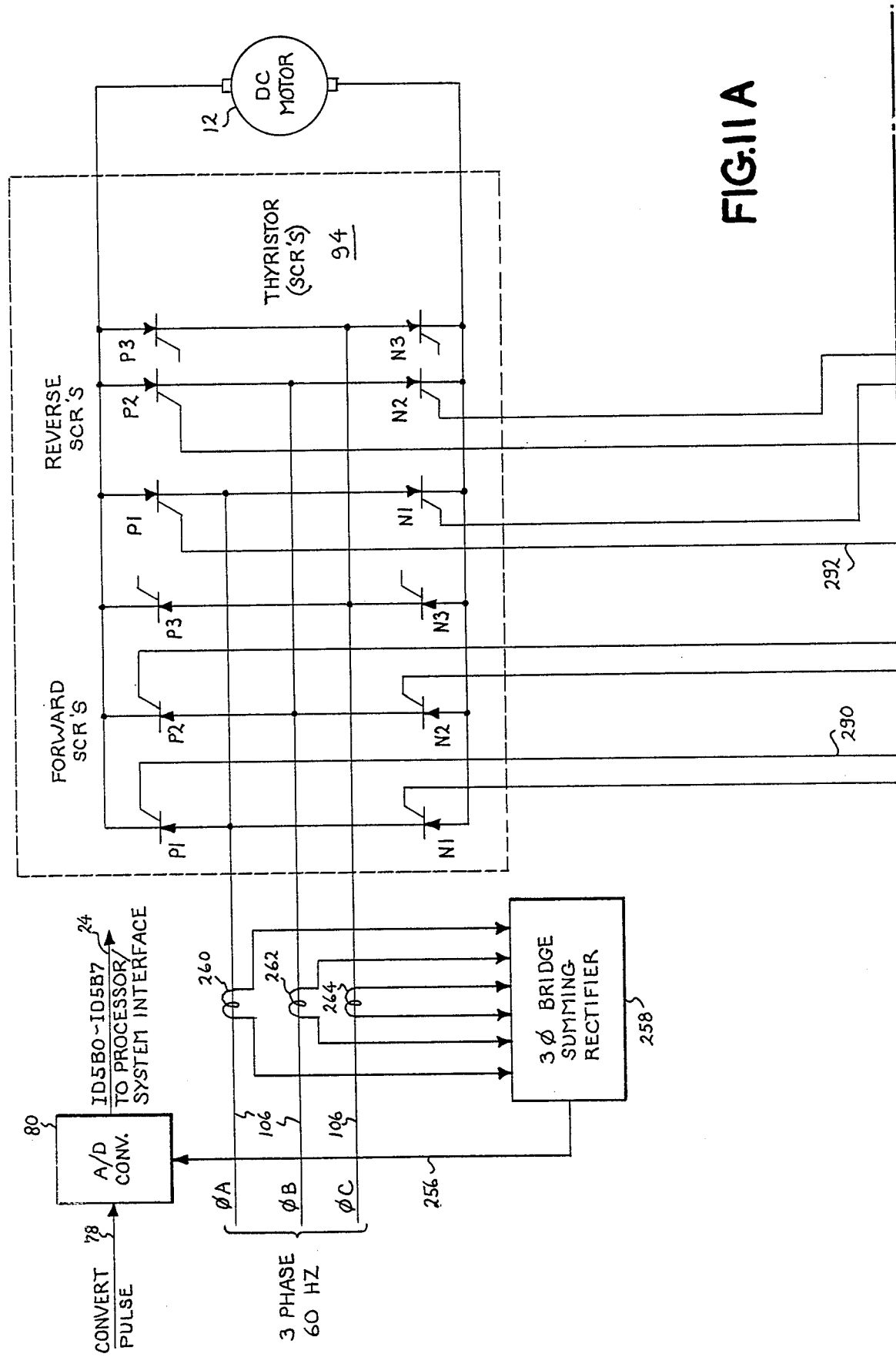
Figure 11B:
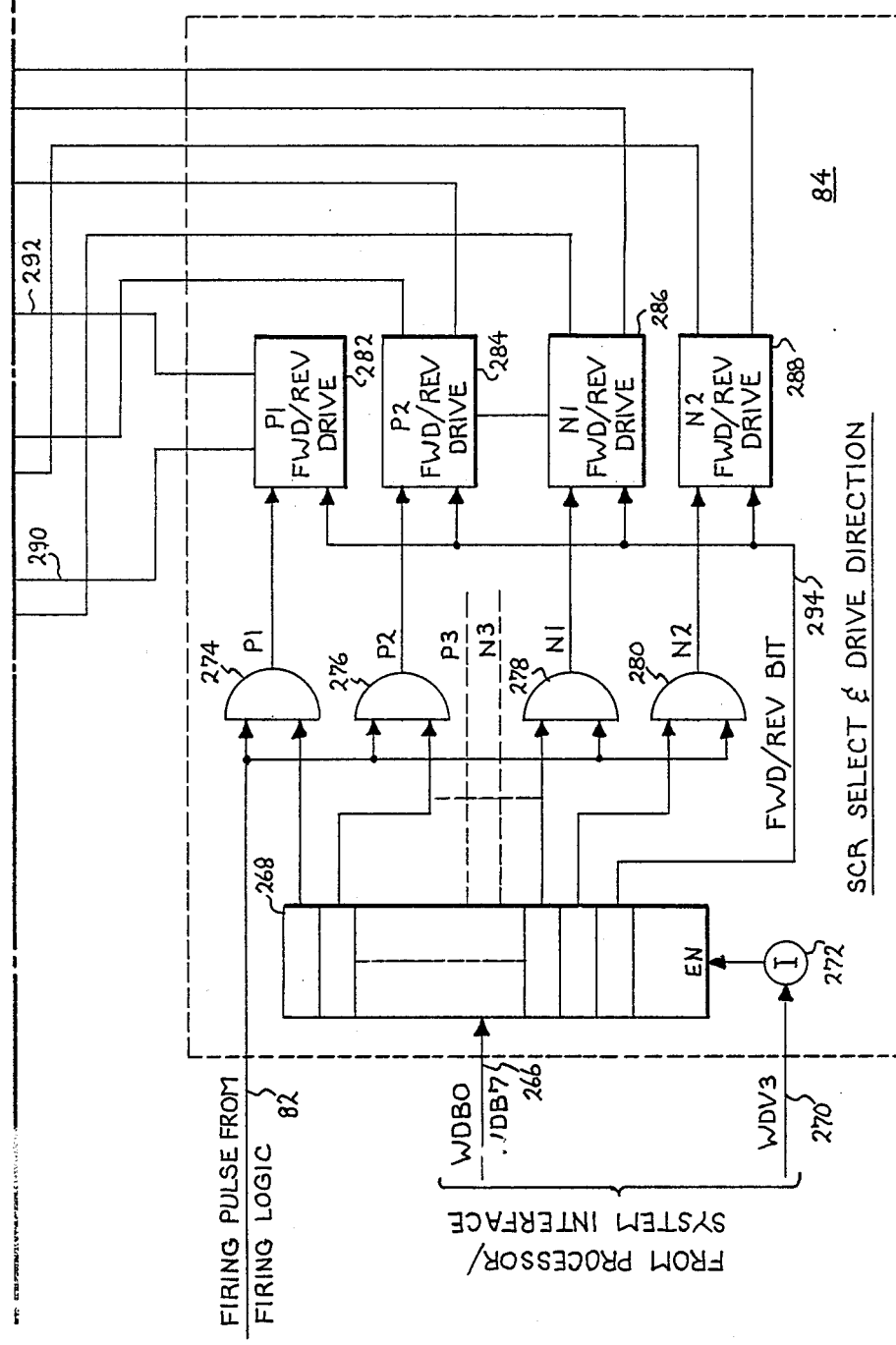

Reference is now made to FIGS. 11A and 11B with FIG. 11A on top of FIG. 11B to form one figure depicting the detailed logic of the select and drive direction 84 and, an electrical schematic of the SCR forward and reverse drive bridges. The analog to digital converter 80 is also shown receiving analog motor current via a conductor 256 from a conventional 3-phase bridge summing rectifier circuit 258. In FIG. 11A, the 3-phase 60 hertz line voltage is applied as $\phi A$, $\phi B$ and $\phi C$ on conductors 106 to respectively associated anodes and cathodes of the forward and reverse SCR bridges, each comprised of six SCR's designated P1 through P3 and N1 through N3 as illustrated in FIG. 11A. The operation of the forward and reverse SCR bridges will not be described in detail here as they are conventional bridge firing networks well known in the art for controlling a DC motor. One such conventional bridge is manufactured and sold by General Electric Company as a Siltrol 1, known as IC3610 integrated static conversion and control equipment for adjustable speed drives.

Three current transformers, designated 260, 262 and 264 are each respectively associated with one of the phase line voltages $\phi A$ through $\phi C$. These transformers provide alternating current inputs into the 3-phase bridge summing rectifier 258 via the irrespective leads, wherein the output of the rectifier to the converter 80 is the average of the three input currents. As previously mentioned, the analog to digital converter 80 is conventional in design, one such converter being manufactured as a model ADC-8QU by Analog Devices Inc. This particular converter is a complete high speed successive approximation 8 bit converter which converts the input analog signal on conductor 256 to a digital value upon the reception of an input command designated the convert pulse on conductor 78. In this particular converter, 7 bits of the 8 bit output denote current magnitude and the 8th bit denotes the polarity of the current. It will be recalled from the previous discussion of the firing logic of FIG. 9, that when the down counter reaches a count of 14, that the firing logic generates an 8 microsecond convert pulse to the A to D converter on conductor 78. It is this convert pulse which starts the A to D converter 80 to convert the motor analog current on 256 to a digital value for subsequent transfer to the data processor via the process interface as data bits ID5B0-ID5B7 on conductor 24.

As shown in FIG. 4, the transfer of the motor current on conductor 24 is accomplished when the A/D converter 80 (Device 5) is addressed via the 8-Bit multiplexer 128 to transfer data to the processor over bus 132. The addressing of the A/D converter is accomplished by the data processor loading a proper address in bits IR5 through IR7 and applying those bits to the SEL terminal of the multiplexer 128, along with the READ pulse to the enable input terminal of the multiplexer. The proper binary bit configuration of bits IR5 through IR7 will channel the motor current reading from the A/D converter 80 through the multiplexer on bus 132 for transfer to the data processor.

Reference is now made to FIG. 11B to the SCR select and drive direction logic 84. The primary purpose of the select and drive direction logic is to receive a data word of address from the data processor via conductors 266 on the right data lines 266 (WBD0-WBD7) from the driver 138 of FIG. 4. This data word is a binary bit configuration loaded into an SCR steering or selection register 268 by a WDV3 signal on a conductor 270 from the decoder 16 of FIG. 4. When the processor sends a write command addressing write Device 3, the WDV3 signal on conductor 270 goes to binary zero and is inverted to a binary 1 through an inverter 272 to thus apply an enable load signal to register 268 to load an SCR pair address into the register. Each of the stages or bits of the register 268, except for one, has its output connected to a corresponding one of a plurality of And gates 274, 276, 278 and 280. It will be noted that the output signal from each of the And gates is designated with a signal corresponding to one of the SCR's in each of the forward and reverse bridges. For example, an output P1 from And gate 274 corresponds to the P1 SCR in each of the forward or reverse SCR bridges. Whenever it is desired to fire a specific pair of SCR's in one of the bridges, a binary word or address is placed in register 268 to enable the particular And gates (274-280) to allow them to provide their appropriate control signals to corresponding forward reverse (FWD/REV) drive switching amplifier circuits.

These FWD/REV drive circuits are of conventional design and are designated 282, 284, 286 and 288. Each circuit corresponds to a like numbered SCR in each of the forward and reverse drive bridges. For example, the P1 FWD/REV drive 282 is connected via conductors 290 and 292 to the respective gate electrodes of the P1 SCR in each bridge. Similar connections are made to the P2 gate electrodes from drive 284 and to the N2 and N3 gate electrodes from drives 286 and 288. It will be noted in FIG. 11B, that only four of the And gates generating the P1 through N3 signals and the drive circuits associated with each of the P1 through N3 SCR's are shown. The And gates and drive electronics for SCR's P3 and N1 have been shown coming out in dashed lines from the select register 268 for simplicity purposes.

It is significant to note that one bit of the firing register 268 generates a FWD/REV signal on a conductor 294 to each of the FWD/REV drive circuits 282, 284, 286 and 288. The drive circuits 282, 284, 286 and 288 are conventional driver or switching circuits of well known design capable of receiving logical inputs to switch their output signals selectively between one of the two lines coming out of each of the drive circuits. For example, in the operation of the drive circuit 282, to activate or fire the P1 SCR of the forward bridge a binary 1 signal is applied from register 268 as one input to gate 274, and upon occurrence of the firing pulse on conductor 82 from the firing logic, gate 274 is enabled passing the pulse through drive P1 to the forward SCR P1. On the other hand, if the FWD/REV bit is a binary 0, drive 282 will be activated to transfer the firing pulse on conductor 292 to SCR P1 of the reverse SCR's. In the present embodiment and in the operation of the SCR's of the rectifier 94, it is desirable to always fire SCR's in pairs, such as P1 and N2 in the Forward and Reverse bridges. The word loaded into Register 268 will always have two binary bits corresponding to the SCR's to be fired. For example, the binary 1 to fire SCR P1 would activate gate 274 and a binary 1 to fire SCR N2 would activate gate 280, the other gates remaining disabled or inactivated.

In order to more fully understand and appreciate the overall operation of the system of the present invention, it is first considered advantageous to describe how the firing angle for firing the SCR pairs is derived in the system.

Figure 12:
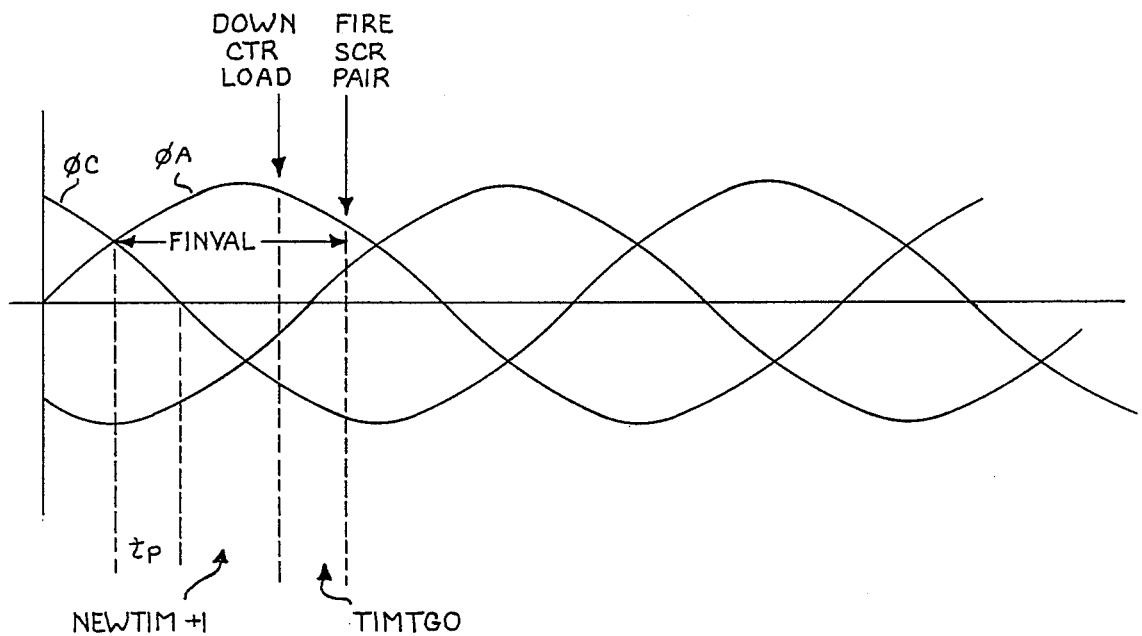
FIG. 12 shows curves helpful in understanding the operation of the present invention.

Reference is now made to FIG. 12 which depicts the interrelationship between the 3-phase power line input voltages, $\phi A$, $\phi B$ and $\phi C$ and a representation of the manner in which the firing angle, designated FINVAL, for the SCR pairs is developed to generate a variable value representative of a signal TIMTGO (Time To Go) which is a calculated value proportional to the firing angle. It is well known in the art that the firing angle for controlling SCR rectifiers of the type utilized in the present invention is measured from the phase-to-phase crossing to the point of firing of the SCR pairs. In the present invention the value of the firing angle, FINVAL, to develop a motor terminal voltage equal to VT is obtained by a table look-up in memory having the representation as shown by Table 1. That which is stored in memory, as the firing angle, is shown in the right-hand column as FINVAL counts.

The FINVAL table is computed from the relation FINVAL=245.8 INVERSE COS $\phi F$ 3VT over $\pi$ $V_{LN}$ where 245.8 equals the number of eleven micro second pulses applied to the down counter to count that counter down per electrical radian. $V_{LN}$ is defined as the voltage from line to neutral of the input power line voltage.

TABLE 1

| VT Vs FINVAL COUNTS | |
|---|---|
| MOTOR TERM. VOLTAGE | FINVAL COUNTS |
| −272 | 715 |
| −256 | 671 |
| −240 | 640 |
| −224 | 615 |
| −208 | 592 |
| −192 | 572 |
| −176 | 553 |
| −160 | 530 |
| −144 | 519 |
| −128 | 503 |
| −112 | 487 |
| −960 | 472 |
| −800 | 457 |
| −040 | 443 |
| −480 | 428 |
| −320 | 414 |
| −160 | 400 |
| 0 | 386 |
| 160 | 372 |

TABLE 1-continued
VT Vs FINVAL COUNTS

| MOTOR TERM. VOLTAGE | FINVAL COUNTS |
|---|---|
| 320 | 358 |
| 480 | 343 |
| 40 | 329 |
| 800 | 314 |
| 960 | 300 |
| 112 | 284 |
| 128 | 269 |
| 144 | 253 |
| 160 | 236 |
| 176 | 218 |
| 192 | 199 |
| 203 | 179 |
| 224 | 157 |
| 240 | 132 |
| 256 | 101 |
| 272 | 57 |

Referring now back to FIG. 12, that figure shows the derivation on the TIMTGO equation, TIMTGO being a value proportional to firing angle which is loaded into the down counter 224 of FIG. 9 to fire the proper SCR pair at the correct time. By definition, TIMTGO = FINVAL − (NEWTIM + 1) × 8 − $T_p$.

In its most simplified form, the method or sequence for loading the down counter with TIMTGO is explained by the following steps:
1. The processor computes the value of FINVAL, the firing angle, which is the current regulator output.
2. The processor next reads the system clock (device 1), as previously described in connection with FIGS. 4 and 5, to establish or define the 60° interval in the input power cycle, and to further define a time within that interval. It then calculates the value of NEWTIM and TIMTGO.
3. Next, the processor reads the system clock repeatedly until the value of the clock equals NEWTIM and then proceeds to load the down counter with TIMTGO. NEWTIM is the value calculated by the processor which is utilized by the program to sepcify at which time TIMTGO is to be loaded into the down counter so that the down counter will begin counting at the proper time. Loading at the time specified by NEWTIM insures that the program is synchronized with the firing of the SCR pairs.

The previously mentioned CRD8 processor utilizes a 300 nanosecond memory which allows step 2 to be performed in approximately 120 microseconds. This 120 microsecond period is slightly less than the time duration of two of the 88 microsecond pulses as developed by the 360 system clock of FIG. 5. Therefore, if TCLOCK is the time represented by bits ID1B3 through ID1B7 of the system clock at the beginning of the previously mentioned Step 2, and if NEWTIM is given by NEWTIM = TCLOCK + 2 (processor calculation time for NEWTIM and TIMTGO), Step 2 will always be completed in time to load the down counter 224 before the system clock transition at NEWTIM + 1. The + 1, which is appended to NEWTIM in FIG. 12, is shown to indicate the 88 microsecond clock period required to load the down counter from the processor. It will be recalled from the description of the system clock of FIG. 5 that the counter 170 counts from 0 to 31 from zero crossing to zero crossing (ZROX). It is possible for the counter to stay at a count of 31 for an interval equal to 32 count, making the last count of counter 170 longer than the previous counts. In this case, if NEWTIM is equal to or greater than 31, one 11 microsecond or fast pulse must be added to $T_p$ since the 31st interval of the system clock is longer. Further, if NEWTIM is greater than 31, the system must be corrected for the reset of the system clock at the next zero crossing (ZROX).

Still referring to FIG. 12, FINVAL = $T_p$ + (NEWTIM + 1) + TIMTGO. In the present embodiment, FINVAL, $T_p$ and TIMTGO are expressed in fast counts or 11 microsecond pulses and NEWTIM + 1 is expressed in slow counts or 88 microsecond pulses. Thus, to convert to equivalent values, FINVAL = $T_p$ + 8 (NEWTIM + 1) + TIMTGO.

The multiplication factor of 8 is to equalize NEWTIM + 1 with $T_p$ and TIMTGO, since it takes 8 fast counts (11 microsecond pulses) to 1 slow count (88 microsecond pulses).

Continuing to develop the TIMTGO equation, substituting the value of TCLOCK for NEWTIM in the equation, gives TIMTGO = FINVAL − $T_p$ − 8 (TCLOCK + 3).

It will be recalled that it takes approximately two slow clock pulses to read the 360° system clock and to calculate NEWTIM and TIMTGO. Therefore, this time must be compensated for in NEWTIM by adding plus 2. Thus, if TCLOCK is the time read by the processor, adding the 2 slow clock pulses of dead time, to compensate for the calculation time, gives NEWTIM + 1 = TCLOCK + 3, as shown in the above equation for TIMTGO.

To equalize TIMTGO, since $T_p$ is in slow clock pulses, TIMTGO = FINVAL − $T_p$ − 8 X TCLOCK − 24. (Note: see 8(TCLOCK + 3) above, 3 slow pulses) equal 24 fast pulses.

Referring still to FIG. 12, $T_p$ is defined as the angle from the phase to phase crossover that defines zero firing angle for the SCR to be fired, to the next phase to neutral cross over. Another way of stating this is to look for the most recent phase to neutral crossing in the zero degree to 360° cycle and subtact from that angle the reference from the cell pair to be fired. This will give $T_p$. For example, if the most recent phase to zero crossing is $\phi C$ going negative at 60° as shown in FIG. 12, and if the SCR pairs P1/N2 are being fired, then the reference angle is 30° (60° − 30° = $T_p$). 30° is the angle between $\phi A$ to $\phi C$ crossing and the $\phi C$ to neutral crossing. If we let $T_p$ + 24 equal $TABT_p$, then TIMTGO = FINVAL − 8 X TCLOCK − TABTP − CORR, where CORR is the correction for the previously mentioned long thirty first pulse of the system clock.

In the operation of the program, the value of TABTP is obtained from a lookup table as illustrated by Table 2. Referring to Table 2, it will be noticed that the TABTP Table is comprised of eleven entries in fast counts representative of degrees which serve as an offset in the TIMTGO equation to compensate for the actual time interval at the time in which the system clock is read by the computer.

Referring now to FIG. 6 and Table 2, it will be noted that the system clock bits ID1B0 through ID1B2, which are the three most significant bits, can be decoded into 60° intervals having numbers 1 through 6 designated KOCT as shown in FIG. 6. and in the left column of Table 2. Referring now to the second column from the left of Table 2, it will be noticed that a listing designated TABPH, representative of the phase 0 crossing numbers, are stored in sequential locations in memory designated PHA1 through PHA6. Each corresponds to a respective phase as is indicated in Table 2.

tract from the table the proper count number in fast counts for insertion into the TIMTGO equation.

TABLE 2

| 60° INTV. KOCT | TABPH φ-0 XING PHA | SCR PAIR CTR. PH | FWD/REV SCR PAIR FIRED | = | PHA-PH TABTP TABLE ADD | TABTP TABLE CONTENTS (FAST COUNTS) |
|---|---|---|---|---|---|---|
| 5 | 1-φA | 1 | P1/N2 | = | 0 |  |
| 4 | 2-φC | 2 | P1/N3 | = | 0 |  |
| 6 | 3-φB | 3 | P2/N3 | = | 0 | −105 = −30° |
| 2 | 4-φA | 4 | P2/N1 | = | 0 |  |
| 3 | 5-φC | 5 | P3/N1 | = | 0 |  |
| 1 | 6-φB | 6 | P3/N2 | = | 0 |  |
|  |  | 2 | P1/N3 |  | −1 |  |
|  |  | 3 | P2/N3 |  | −1 |  |
|  |  | 4 | P2/N1 |  | −1 | −362 = −90° |
|  |  | 5 | P3/N1 |  | −1 |  |
|  |  | 6 | P3/N2 |  | −1 |  |
|  |  | 1 | P1/N2 |  |  |  |
|  |  | 3 | P2/N3 |  | −2 |  |
|  |  | 4 | P2/N1 |  | −2 |  |
|  |  | 5 | P3/N1 |  | −2 | −619 = −180° |
|  |  | 6 | P3/N2 |  | −2 |  |
|  |  | 1 | P1/N2 |  | 4 |  |
|  |  | 2 | P1/N3 |  | 4 |  |
|  |  | 4 | P2/N1 |  | −3 |  |
|  |  | 5 | P3/N1 |  | −3 |  |
|  |  | 6 | P3/N2 |  | −3 |  |
|  |  | 1 | P1/N2 |  | 3 | 667 = +180° |
|  |  | 2 | P1/N3 |  | 3 |  |
|  |  | 3 | P2/N3 |  | 3 |  |
|  |  | 5 | P3/N1 |  | −4 |  |
|  |  | 6 | P3/N2 |  | −4 |  |
|  |  | 1 | P1/N2 |  |  |  |
|  |  | 2 | P1/N3 |  | 2 | 410 = +90° |
|  |  | 3 | P2/N3 |  | 2 |  |
|  |  | 4 | P2/N1 |  | 2 |  |
| 5 | 1-φA | 6 | P3/N2 | = | −5 |  |
| 4 | 2-φC | 1 | P1/N2 | = | 1 |  |
| 6 | 3-φB | 2 | P1/N3 | = | 1 |  |
| 2 | 4-φA | 3 | P2/N3 | = | 1 | 153 = +30° |
| 3 | 5-φB | 4 | P2/N1 | = | 1 |  |
| 1 | 6-φC | 5 | P3/N1 | = | 1 |  |

At the time of reading of the system clock, the computer will utilize the KOCT number to address the corresponding one of the PHA locations in TABPH as indicated in Table 2. For example, it can be seen that KOCT5 of FIG. 6 and in the left hand column of Table 2, is equal to phase 0 crossing PHA1 or φA and that KOCT4 is equal to phase 0 crossing PHA2 or φC, etc.

The processor also includes an SCR pair to be fired as designated in the column PH of Table 2. The PH counter is incremented or updated a specified amount during the program each time an SCR pair is fired. Thus, firing takes place in a specified sequence. To obtain the proper TABTP value for the calculation of TIMTGO, the address developed from the difference between the PHA and PH (PHA-PH) values is utilized to develop an address to the TABTP table. It will also be noted that the SCR pair counter PH always specifies a particular pair of SCR's to be fired. For example, when the SCR pair counter PH is at a 1, the SCR pair P1/N2 will be fired, whereas if the counter is at 6, pair P3/N2 will be fired, etc.

It will further be noted, that there are 6 address entries to each of the TABTP locations in memory, each of those 6 addresses being representative of one of the six zero crossings in a complete cycle of the input voltage. It will also be noted that each of the SCR pairs gets fired once each 60°, or six firings in each 360° cycle of the input sinewave. It will further be noted that the PHA0 crossing number does not always correspond to the PH counter value. This is due to the fact that any given cell pair can be fired at any 60° interval during a 360° cycle period. It is this difference between the PHA numbers and the PH counter numbers which allows the derivation of the addresses to the TABTP table to ex- Prior to preceding with a description of the program for controlling the overall operation of the regulating and control system of the present invention, reference will be made to FIG. 13 which shows, in simplified bar chart form, the overall system operation to develop the value TIMTGO proportional to firing angle to fire the SCR pairs in the rectifier 16 of FIG. 1. To understand the showing of FIG. 13, it is considered advantageous to make an assumption that some SCR pair in the rectifier has just fired. As previously described, whenever an SCR pair is fired, the INT flip-flop 250 of FIG. 9 generates an interrupt signal to the processor. This interrupt causes the processor to branch to an interrupt subroutine which effectuates the reading of the analog to digital converter 80 into the computer. As shown at this time, the processor loads the down counter with a count proportional to a 20° delay. The present invention is capable of operating in either continuous or discontinuous current mode and the purpose of loading the 20° delay into the down counter 224 of FIG. 9 is to allow the processor time to determine the mode of operation in which the regulator is to operate and to set gains or constants for either continuous or discontinuous mode operation in the proper manner. The manner in which this is done will subsequently be described in connection with the program.

Figure 13:
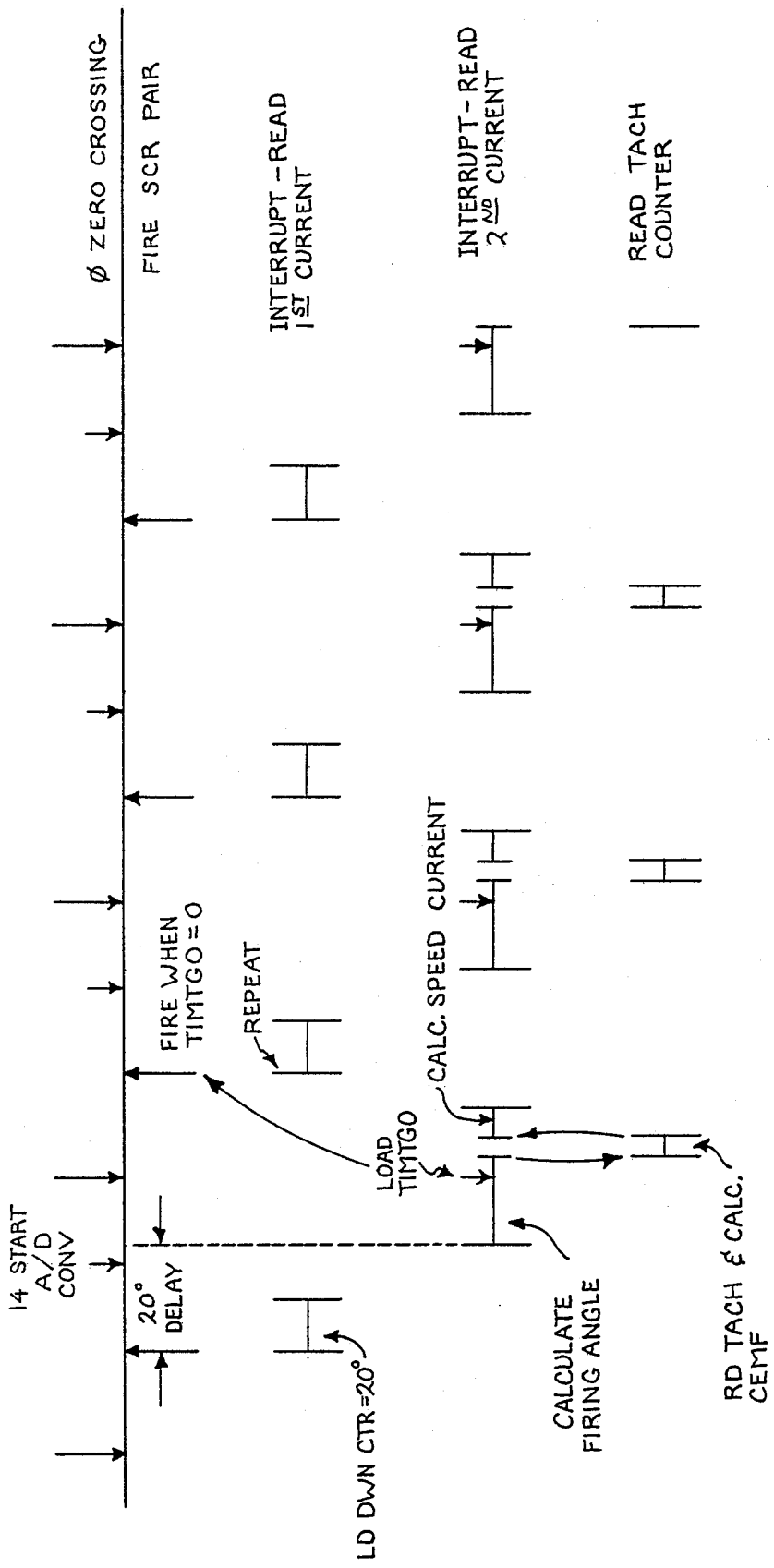
FIG. 13 is a bar chart flow diagram helpful in understanding the sequence of operation of the invention.

Still referring to FIG. 13, it will be noted that at a count of 14 in the down counter 224, as previously described, the convert pulse is sent to the A/D converter on conductor 78 to activate the converter to begin the analog to digital conversion. At the termination of the 20° delay, or when the down counter 224 reaches the predetermined count of 0, the INT flip-flop 250 again sends a second interrupt signal to the processor. Upon receipt of the second interrupt signal, the processor interrupt subroutine performs the calculations of the firing angle FINVAL to develop the TIMTGO value. As can be seen in FIG. 13, the entire reading and calculation of the firing angle takes place between the firing of successive SCR's. Since there is an SCR firing every 60° of the input sine wave cycle, it can be seen that the entire calculation for firing angle to fire the next pair of SCR's is done in a 60° interval. The 20° delay which has been selected is the maximum value which leaves time for the regulator calculations, (i.e. time to calculate the firing angle), and to still generate a positive TIMTGO when the phase advance rate is maximum.

The second current which is read by the processor is utilized in the regulator response calculations. The advantages in performing the calculations in this manner are:

1. The control time lag as seen by the overall regulator is minimized, thus maximizing the performance of the regulator.

2. The second current read will always have some finite value at all practical operating levels of the regulator so that the regulator can operate during the discontinuous current mode. This is due to the fact that the second current reading is taken 20° after the first current reading.

3. And, as will subsequently be described, a single down counter such as down counter 224 of FIG. 9 is required since counting is never started until after the previous SCR pair is fired.

Still referring to FIG. 13, once the calculations are completed the processor loads the TIMTGO value into the down counter 224 of FIG. 9, at which time that counter begins to count towards 0. The program then branches immediately to a READ TACH counter subroutine RDTACH, wherein the tach pulse counter 88 is read by the processor and the value of a feed forward counter electromotive force (CEMF) is calculated for use in calculating Commanded Motor Terminal Volts (VT).

Upon completing of the RDTACH subroutine, the program branches back to the interrupt subroutine, to calculate a Rate of Change of Current Set Point (SPDESI). The program now goes into a loop and waits until the firing counter achieves a count of 0, as shown in the top line of FIG. 13, at which time the SCR pair is fired and an interrupt is again issued to the processor and the process just described is repeated.

Figure 14:
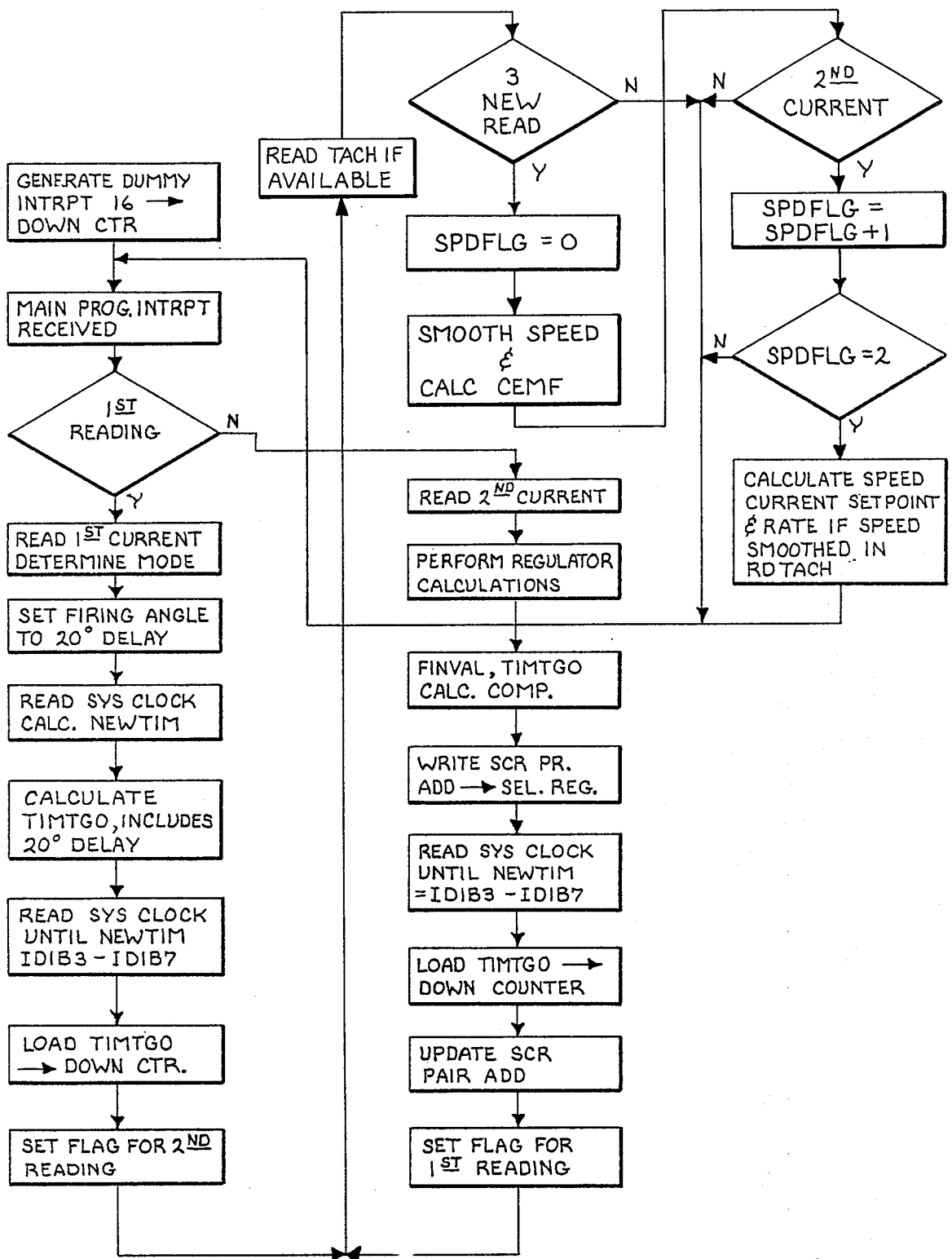
FIGS. 14 through 24 are flow charts useful in understanding the method of operation of the regulating and control system of the present invention.

Reference is now made to FIG. 14, which is a high level flow chart showing the overall operation of the regulating and control system of the present invention in somewhat more detail then that just described in connection with FIG. 13.

When the system is first started up, as shown in the left hand top block of FIG. 14, the program generates a dummy interrupt to the system by loading a number 16 into the down counter 224 of FIG. 9. Also at this time, zeros are loaded into the SCR select register 268 of FIG. 11B. The down counter will now begin to count down toward 0. When it reaches 0, the INT flip-flop 250 of FIG. 9 generates an interrupt signal on conductor 210 to the processor. The purpose of loading all zeros into the SCR select register is to prevent any SCR pair from being fired at this time.

The processor enters into the interrupt subroutine upon receipt of the interrupt. The program now enters a 1st reading decision block determining if this is the first or second current reading from the A/D converter 80 of FIG. 3. Assuming that it is the first current reading, the program goes through a "yes" Y branch into a block wherein the first current is read from the A/D converter. The program further determines, in this block, whether the system is in either the continuous or discontinuous current mode by comparing the value of the first current against a constant proportional to a predetermined current. The program then proceeds to set the previously mentioned firing angle for a 20° delay. The program proceeds to read the system clock bits ID1B0 through ID1B7 on conductors 90 of FIG. 5 and to calculate the value of NEWTIM. Upon the completion of the NEWTIM calculation, the program continues to calculate TIMTGO, which at this time includes the 20° delay. The program then goes into a loop and continues to read the system clock until NEWTIM is equal to the 5 least significant bits of the divide by 32 counter 170 of FIG. 5, designated ID1B3 through ID1B7. When these two values are equal, the processor loads the TIMTGO value proportional to firing angle into the down counter and proceeds to set a flag for the second reading.

The program now proceeds to check if a new tachometer reading is available in the Tach Pulse Counter Register. If a new reading is available, it is read and added to the tachometer readings already accumulated in memory (CACTI). The program now checks to see if three successive readings have been accumulated. If not, the program takes a "no" N branch and enters back into the main program when another interrupt is received from the processor (i.e. when TIMTGO equals 0). At this time, the 1st reading decision block is again entered, and upon this entry, since the flag for second reading has been set, the program will exit through the N branch of that last decision block and enter into a block wherein the processor will read the second current from the A/D converter.

After having read the second current, the program will perform the regulator calculations to calculate FINVAL and TIMTGO. Upon the completion of these calculations, the processor will write the SCR pair address into the SCR select register 268 of FIG. 11B. At this point, the processor again goes into a loop to continue to read the system clock until the values of NEWTIM and ID1B3-ID1B7 are equal. When these values are equal, the processor is told to load TIMTGO into the down counter. The processor then proceeds to update the SCR pair address in the previously mentioned PH counter and to set the flag for the first current reading, so that upon the next pass through the program a first reading will be taken. The program now proceeds back to again read the tachometer, if a reading is available, and then tests to see if three successive tachometer readings have been accumulated. If three readings have not been accumulated and a Speed Regulator Request Flag (SPDFLG) is not set, the program will continue through the loop just described entering back through the 1st reading decision block, out the Y branch and continuing to perform the current regulator calculations as just described on the second reading. If, after the previously mentioned check for a new tachometer reading, three successive readings are available, new values for motor speed (CACT), Smoothed Motor Acceleration (TACSMD), and Counter Electromotive Force (CEMF) are computed. The Speed Request Regulator Flag (SPDFLG) is set to zero to cause a speed regulator calculation to be made. At the completion of these calculations, if the flag is set for a second current reading indicating that a first reading has just been made, the program branches back to the main program pending an interrupt from the firing logic INT flip-flop 250 of FIG. 9 as previously described. However, if the flag is not set for the second reading a Y branch will be taken to a block to test for the time to perform the speed regulator calculation, the SPDFLG is incremented by 1 and then tested for the value of 2. If the test passes, the speed regulator calculation is entered. If not, the main program is re-entered as before. This procedure insures that the regulator and smoothing calculations will not be performed in the same interval between SCR firings. This was done to prevent overloading the computer. Upon completion of the speed regulator calculations, the program enters into the main program pending receipt of the interrupt from the firing counter.

Figure 15:
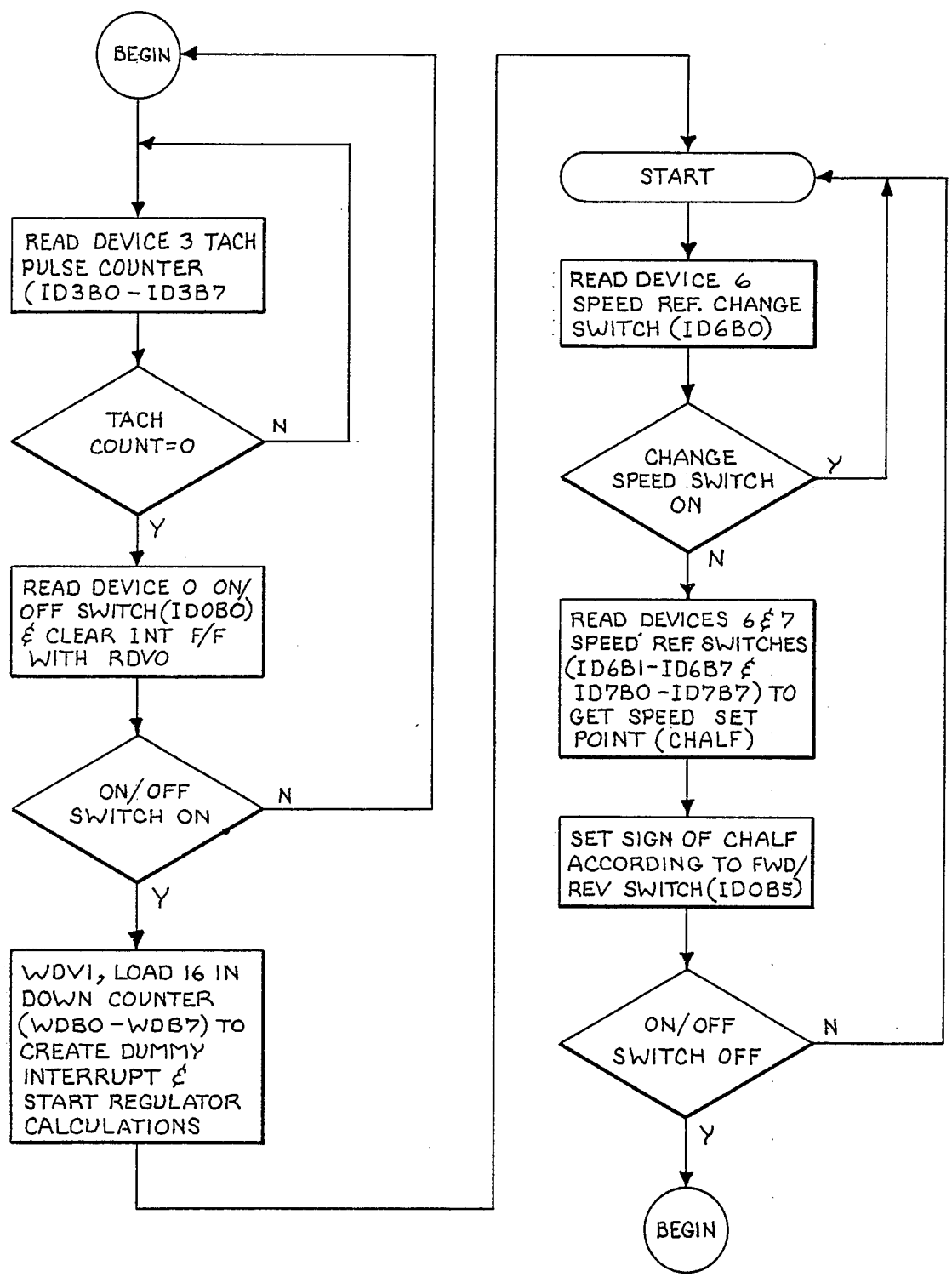

With the broad background of the description of the system operation in regard to FIGS. 13 and 14, reference is now made to FIGS. 15 through 24, which show in detailed flow chart form the execution of the current regulator program for controlling the regulating and control system of the present invention. Reference is first made to FIG. 15, which is a flow chart depicting the main program of the present invention. Not shown in FIG. 15 is a standard initialization routine which every program normally runs through to initialize all the various registers and storage locations in memory in preparation to running a program. Since this type of initialization is well known in the art, it is not shown in FIG. 15 and the program is assumed to start at an entry point designated BEGIN. When the system is first started, the processor reads device 3, the tach pulse counter 88, as shown in FIGS. 4 and 7. The bits read by the computer are ID3B0 through ID3B7 on conductors 22. These bits are read through the 8 bit multiplexer 128 of FIG. 4 in response to a read address as designated by bits IR5 through IR7 and a READ P pulse on the enable line to the multiplexer 128.

The processor then tests in a decision block TACH COUNT = 0 to determine if the motor is turning. If the tach count reading (ID3B0-ID3B7) is not 0, it indicates that CEMF is not 0 and that the motor is rotating, thus the program will take a N branch from that decision block and continue to loop back to BEGIN until the CEMF or TACH COUNT is 0. When the TACH COUNT is 0, the program exits through a Y branch into the next action block wherein the processor reads device 0 (18' of FIG. 4). ID4B0 is the bit read at this time by the processor to read in the on/off switch to see if the motor has been turned on. Additionally, the processor sends a read device 0 command to the processor system interface developing the RDV0 signal on conductor 130 to the INT flip-flop 250, thus resetting that flip-flop. The INT flip-flop 250 is now in a state to generate an interrupt signal at the proper time during the operation of the system.

The program now proceeds into a decision block ON/OFF SWITCH ON. In that decision block, if the ON/OFF switch just read from device 0 is not in the on state the program takes an N branch back to the beginning of the program and continues to loop in the program until the ON/OFF switch is turned on. Assuming now that the ON/OFF switch is on, the program will exit through a Y branch, entering to an action block wherein the processor transfers a write device 1 command along with data bits WDB0-WDB7 to the processor system interface of FIG. 4 to cause the generation of the WDV1 signal on conductor 212 to be sent to the firing logic of FIG. 9 and load the count of 16 into the write data latch and into the down counter 224 in the manner as previously described. The purpose of loading 16 into the down counter 224 is to create a dummy interrupt to the processor so that the processor can begin to execute the main program and all subsequent subroutines which are entered from the main program.

At this point, the down counter begins counting down while the program proceeds immediately to a START entry point as shown in FIG. 15. The processor now sends a read device 6 command to the processor system interface to effect the reading of the speed reference change switch designated by bit ID6B0 on conductors 66 as shown in FIG. 4. The state of bit ID6B0 is now interrogated by the processor to determine if the speed change switch is in the ON state. The speed change switch is an operator controlled switch on a console, not shown, forming part of the speed reference switches 18 (input devices 6 and 7) which is actuated by an operator when he desires to change the speed reference input to the data processor to change the speed of the motor. So long as this switch is in the ON state, the program will continue to exit through the Y branch of the CHANGE SPEED SW ON decision block and loop back to the START point.

Let it now be assumed that the change speed switch is not ON. The program will exit through a N branch entering into an action block wherein the processor sends commands to the processor system interface to read devices 6 and 7 via conductors 66 into the processor. In this instance, the previously mentioned speed reference switches, which are representative of motor rpm speed set point (bits ID6B3 through ID6B7 and ID7B0 through ID7B7) are stored in a memory location in the processor program 62 designated CHALF, the storage location for the speed set point.

The program now proceeds to set the sign of location CHALF in accordance with the setting of the FWD/REV switch by first sending a read device 0 signal to the system interface and reading in bit ID0B5 from device 0. If ID0B5 specifies that the motor is to run in the forward direction CHALF is not changed, however, if ID0B5 specifies that the direction of the motor is to run in reverse, then the 2's complement of CHALF is taken and accordingly substituted for CHALF.

The program now proceeds to determine if the ON/OFF switch is in the OFF position. If the motor is in the OFF position, the program will exit through a Y branch and go back to BEGIN and the operations just described will be repeated. Assuming, however, that the ON/OFF switch is not in the OFF position, the program will exit from that last decision block through a N branch returning to the START entry point as shown in FIG. 15. The program will now continue to loop from the START point down through the ON/OFF SWITCH OFF decision block until an interrupt signal is received by the data processor from the INT flip-flop 250 in the firing logic 9.

As previously described in connection with the firing operation of logic, when the down counter achieves a count of 0, the INT flip-flop 250 is set to generate the INT signal on conductor 210 to the processor. It is significant to point out that the interrupt signal from the firing logic can occur at any time during the execution of this latter loop, (i.e. between the START entry point and the ON/OFF SWITCH OFF decision block).

Figure 16:
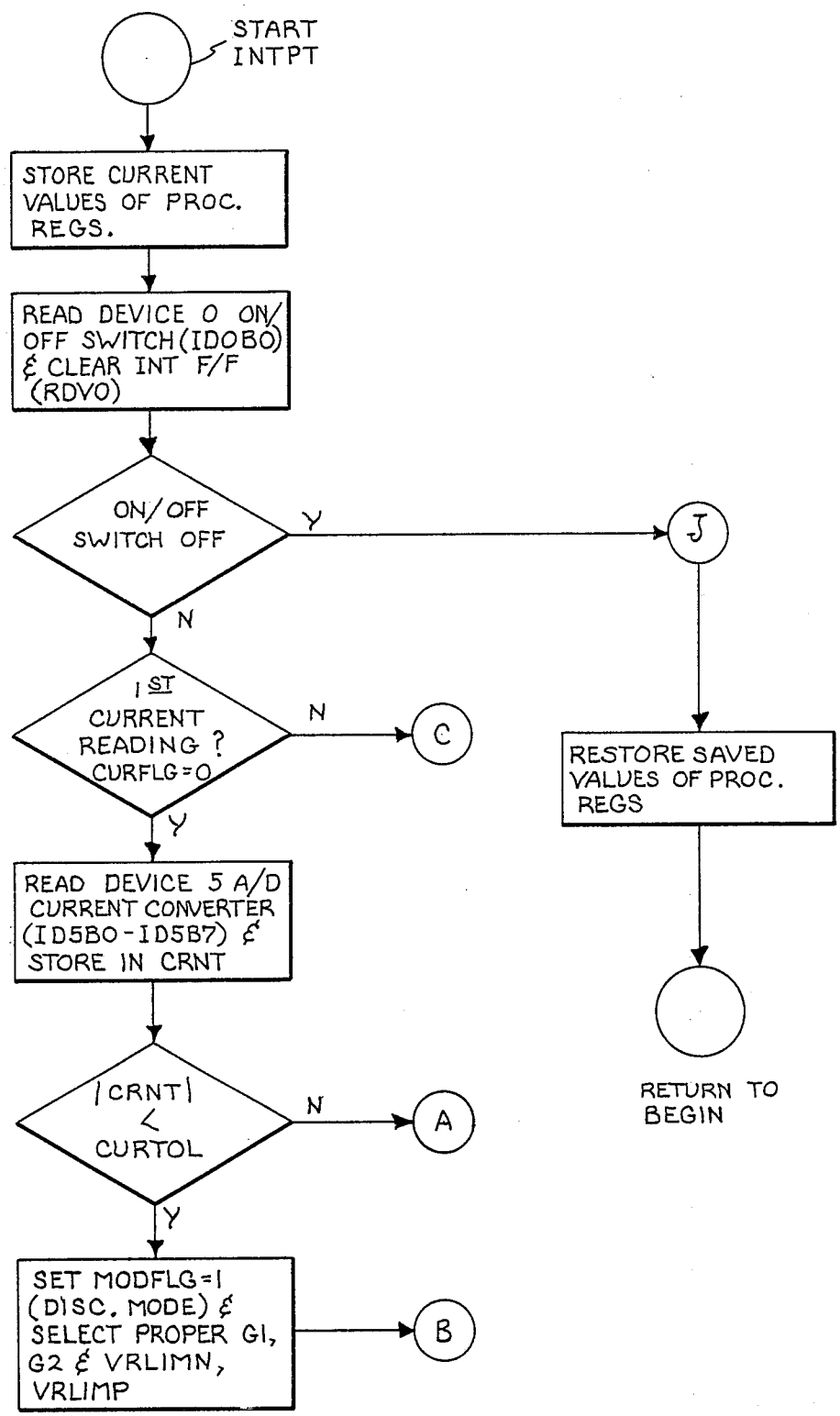

When the interrupt occurs, the processor will branch from the main program of FIG. 15 into a start INTPT point of FIG. 16, the beginning of the interrupt program. As will subsequently be seen, at the termination of the interrupt program when all calculations have been completed, the interrupt program will return to the main program of FIG. 15 at the point where the interrupt occurred.

Let it now be assumed that the processor has generated the interrupt signal on conductor 210, causing the program to enter into the START INTPT point of FIG. 16. The first operation by the processor is to store the current values of the various processor registers, namely those of the scratch pad memory previously described in connection with FIG. 2. This is a standard procedure in all operating programs when branching from one subroutine or program to another so that those values can be restored later when return is made back to the program from which the branch was made.

The processor then proceeds to send a read device 0 command to the processor interface of FIG. 4 to again read the ON/OFF switch bit ID0B0 and to simultaneously reset or clear the interrupt flip-flop sending the RDV0 signal to the firing logic from the decoder 126 of FIG. 4 in the manner as previously described. The ON/OFF switch is now tested to see if it is in the OFF state. If the switch is in the OFF state, indicating that power should be removed from the motor, the program will exit through the Y branch, the previously stored registers will now be restored back to their original values and the program will return to FIG. 15 wherein the operations will take place as previously described. Assuming at this time, however, that the ON/OFF SWITCH is not in the OFF state, the program will exit through an N branch into a 1st CURRENT READING (CURFLG = 0) decision block. In this decision block, a test is performed to see if this is the first current reading. The test here is performed on a variable flag in memory designated CURFLG for current first reading flag. When the CURFLG is equal to 0 it indicates that this is the first current reading, when it is a binary 1 it indicates that it is the second current reading.

Assuming at this time that CURFLG is equal to 0, the program will exit through a Y branch and enter into an action block wherein the processor sends a read device 5 command to the processor system interface directing the reading of the analog to digital converter 80 to read bits ID5B0 through ID5B7 through the 8 bit multiplexer into the processor on input data lines ID0 through ID7. The value specified by the ID5B0-ID5B7 bits is stored in a location in memory designated CRNT, which is a storage location for the measured motor current. The program now proceeds into decision block wherein a constant value CURTOL stored in memory is compared against the absolute value of CRNT. The value of CURTOL is a value proportional to 1 to 2 percent of the rated motor current and is utilized to test for discontinuous current operation. If CURTOL is less than CRNT, the program exits through a Y branch going into discontinuous mode, whereas, if CURTOL is greater than CRNT it will be the continuous mode and the program exits through the N branch.

Let it at first be assumed that the motor is operating in the discontinuous mode. Exiting through the Y branch, the processor will set a mode flag MODFLG is memory equal to a 1, indicating that the system is now in discontinuous current mode. Stored in memory are four constants designated G1 and G2. There are two G1's and two G2's, one pair is utilized when the system is in discontinuous mode and the other pair of G1-G2 is utilized when the system is in continuous mode. These constants, used for continuous and discontinuous current modes, are gain constants chosen to provide the overall gain required by the motor drive loop when operating in either one of the modes. For example, in discontinuous mode the program will select the proper G1 and G2 having gains of 32 and 0 respectively. Also, in this latter action block, negative and positive upper and lower limits (VRLIMN and VRLIMP) are retrieved from memory and brought into the interrupt subroutine for subsequent use in establishing upper and lower limits for the motor voltage to be computed by the current regulator.

Figure 17:
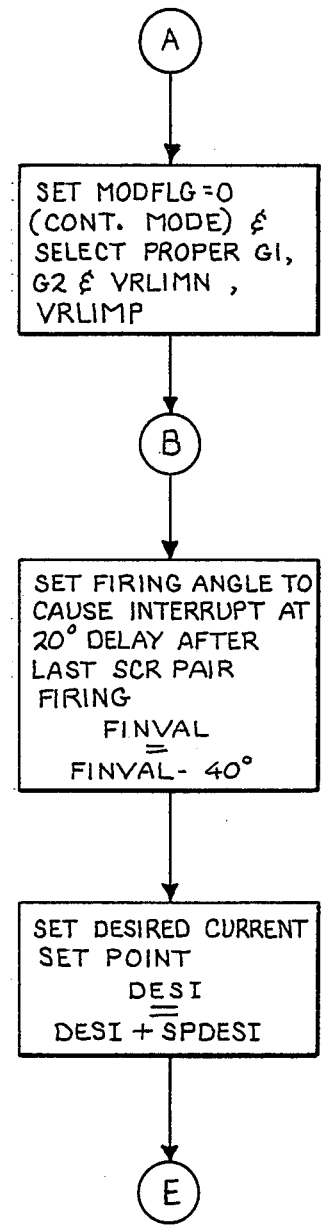

Upon the completion of these last operations the program will now enter into the connector B of FIG. 17. Referring now to FIG. 17, it will be noted that connector A from FIG. 16 also comes into FIG. 17. As previously described, if the system is in the continuous mode, entry will be into FIG. 17 connector A. At entry into connector A, the operations which take place in the first action block are the same as those described in the last action block of FIG. 16, with the exception that the MODFLG is set equal to 0 for continuous mode operation. The program will also select the proper G1 and G2 for continuous current mode operation. (An example of the values of these gains would be G1=15 and G2=11)

Upon entry into connector B of FIG. 17, the processor sets the firing angle to cause an interrupt 20° after the last SCR pair firing. This is accomplished by setting the firing angle FINVAL in memory equal to FINVAL minus a count proportional to 40°. Subtracting 40° from FINVAL causes an interrupt at the correct time for the second current reading. If TIMTGO were calculated utilizing the old value of FINVAL, the SCR pair would be fired 60° later. By subtacting 40° from FINVAL, the down counter value is set to create an interrupt at 20° after the last SCR pair firing. The program now proceeds into an action block wherein a location in memory DESI, designating desired current set point, is set equal to itself plus a calculated value SPDESI, indicative of a desired rate of change of current set point.

Figure 20:
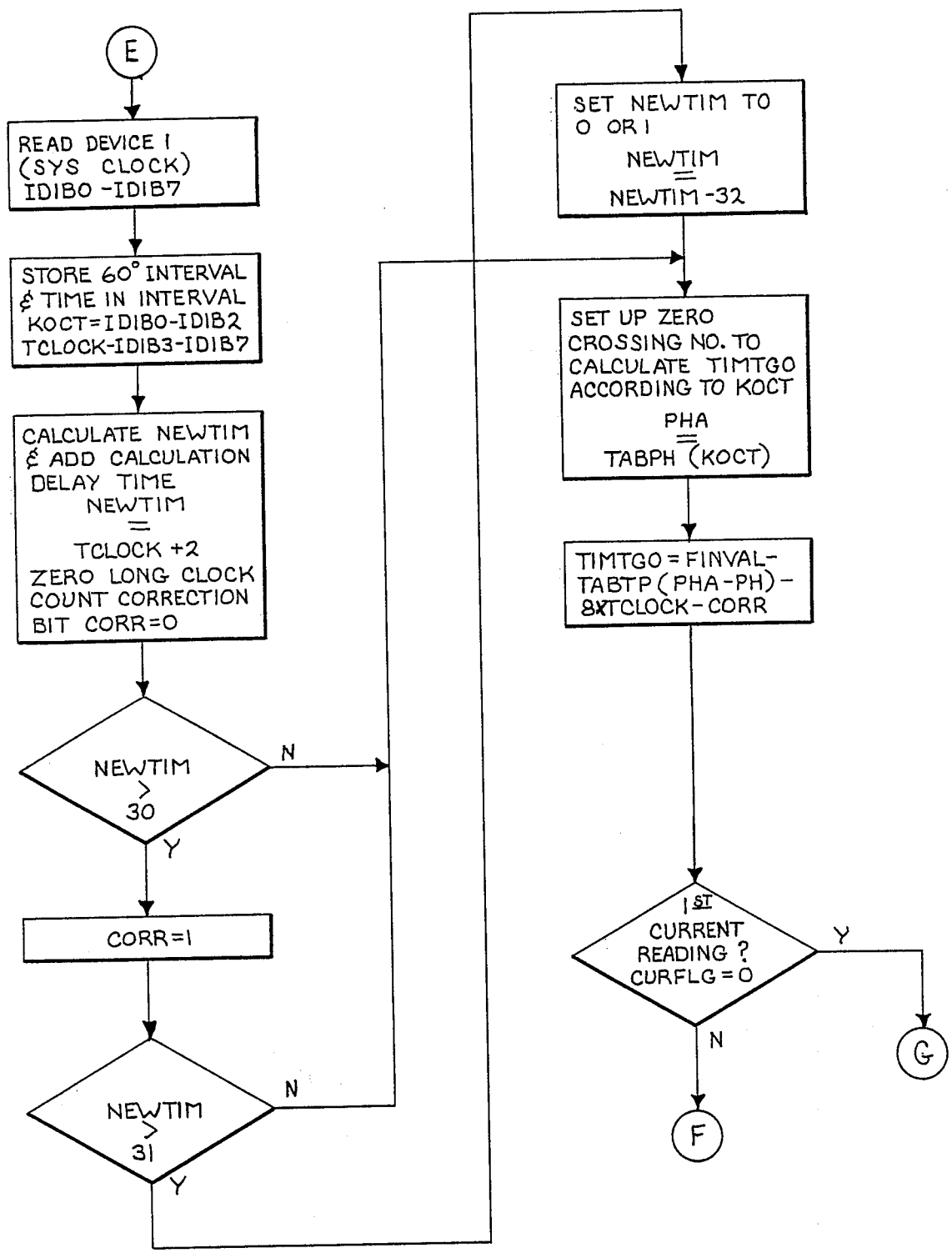

The program now goes to a connector E of FIG. 20 entering into an action block wherein the processor sends a read device one command to the processor interface to read the system clock bits ID1B0-ID1B7 on conductors 190 as depicted in FIGS. 4 and 5. In the next action block the 60° interval, as specified by bits ID1B0-ID1B2, is stored in location KOCT (see Table 2) and the time within the interval, represented by bits ID1B3 through ID1B7, is stored in a location in memory designated TCLOCK.

The processor now proceeds to calculate the value of NEWTIM by setting that location in memory equal to TCLOCK plus 2, which is the delay time previously described for the calculation in describing the derivation of the TIMTGO equation. Also, at this time the long clock count correction CORR is set equal to 0. The program now proceeds into a NEWTIM > 30 decision block. If NEWTIM is greater than 30, the program will exit through a Y branch setting the CORR bit to a 1. The program will now proceed into another decision block NEWTIM > 31. If the NEWTIM is at 32, or greater, the program will exit through a Y branch into an action block at the top right hand portion of FIG. 20, wherein NEWTIM is set to either 0 or 1 by setting NEWTIM=NEWTIM −32. If NEWTIM happens to be 32, it will be set to zero whereas if NEWTIM is equal to 33 (i.e. TCLOCK = 31 + 2 = 33), it will be set equal to 1.

Figure 21:
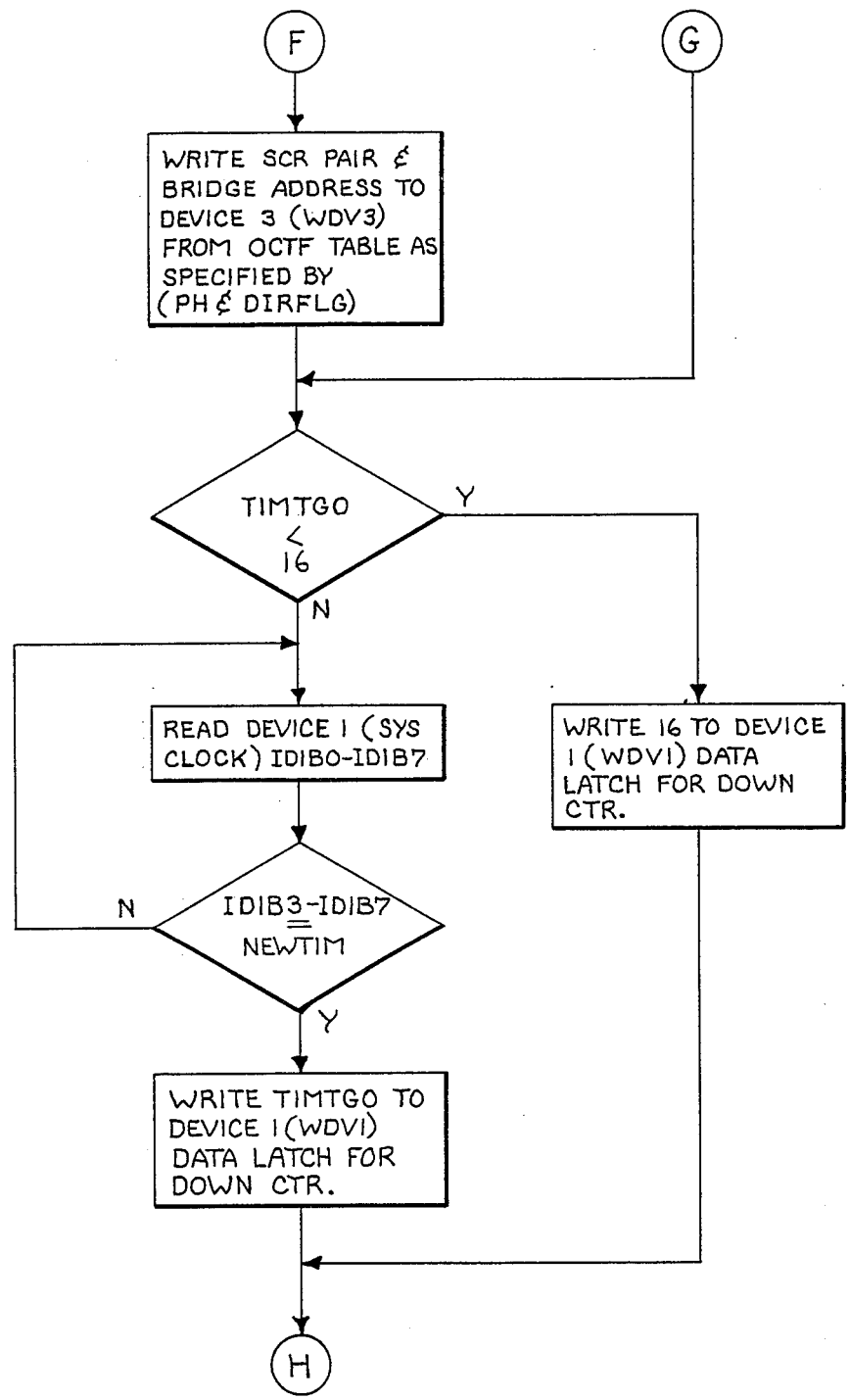

Reference is now made back to the NEWTIM > 30 and NEWTIM > 31 decision blocks of FIG. 20. If either of those decisions is negative, the program will exit through an N branch of the appropriate decision block and enter into an action block wherein the zero crossing number PHA in memory is used to calculate TIMTGO by using the value of KOCT as an address to the PH Table (TABPH) by setting PHA equal to TABPH (see Table 2). The processor now proceeds to calculate TIMTGO by setting TIMTGO equal to FINVAL the firing angle minus TABTP (the offset correction of Table 2 as addressed by the difference between PHA and PH) minus 8 times TCLOCK (the time interval just read) minus the value of CORR. CORR will be either a zero or a one at this time depending on whether NEWTIM was greater than or less than 31. The processor now enters into a CURFLG = 0 decision block where a test is again performed to see it this is the first current reading. If CURFLG is not equal to 0, indicating that this is a second current reading, then entry into FIG. 21 is at connector F at an action block wherein the processor writes the SCR pair and bridge address to Device 3, the SCR select and drive direction register 268 of FIG. 11B, by issuing a WDV3 command over conductors 270 and sending the SCR pair and bridge address over conductors 266 as write data bits WDB0 through WDB7 from the drive 138 of the processor system interface 4. The SCR pair and bridge addresses come from a table in memory, designated OCTF, which contains 12 separate address entries, 6 for the forward SCR bridge and 6 for the reverse SCR bridge. The locations in the OCTF table are addressed by the contents of the PH counter, which specify the SCR pair to be fired, and the direction flag DIRFLG, a flag in memory that specifies whether to fire the forward or reverse bridge.

It will be recalled from the previous description, that the firing of the SCR's actually takes place after the calculation of TIMTGO has been performed (i.e. subsequent to the reading of the second current). Thus, it is necessary to change the SCR pair and bridge address in order to fire the proper SCR's. On the other hand, if it is a first current reading it is not desirable to change the SCR pair and bridge address as no firing is done at that time. Therefore, if it is not the first current reading, entry is into FIG. 21 at point G from FIG. 20 and the SCR pair bridge address update is bypassed.

The program now proceeds into a TIMTGO < 16 decision block. If TIMTGO is less than 16, the program exits through a Y branch to an action block wherein the processor writes the number 16 to device 1, the down counter, by the generation of the WDV1 signal from the processor system interface along with the number 16 on the write data bus lines WDB0 through WDB7 as previously described. The reason for testing for TIMTGO < 16 is that a minimum limit is placed on the value of TIMTGO to insure that there is always at least 4° delay prior to the generation of an interrupt to the data processor so that a convert command will be sent to the A/D converter 80 to cause a new conversion to be made.

Still referring to FIG. 21, if TIMTGO is not less than 16, the program branches through a N branch entering into a READ DEVICE 1 action block wherein the processor again reads the system clock bits ID1B0 through ID1B7. The program now goes into a loop via a decision block ID1B3 − ID1B7 = NEWTIM which exits through a N branch back into the read device 1 action block and continues to circulate in that loop until the system clock equals NEWTIM. When these two values are equal, it is time to load the down counter, and the program takes a Y branch entering in to an action block where, the processor writes TIMTGO into the down counter 224 of FIG. 9.

As was previously described, on the occurrence of the next 88 microsecond clock signal (see FIGS. 9 and 10) following the loading of the down counter, the down counter starts to count TIMTGO down toward 0. When the down counter reaches 0, the processor will again generate an interrupt signal on conductor 210 from (FIG. 9) thus creating another interrupt for the processor as previously described. Immediately upon transferring TIMTGO to the down counter, the processor goes from connector H in FIG. 21 to connector H in FIG. 22 entering into a CURFLG = 0 decision block. In this decision block a test is performed to see if this is the first current reading. If it is the first reading, the processor will exit through an N branch entering into an action block wherein, location CURFLG, the current reading flag, is set equal to 1 to designate that the second reading will be coming up on the next pass through the program. On the other hand, if it is the first reading, the program will exit from CURFLG = 0 decision block through a Y branch entering an action block wherein the sequence counter PH is set equal to PH + 1, thus incrementing the SCR pair address so that the proper SCR pair will be fired on the next calculation of TIMTGO.

The processor now proceeds into the PH > 6 decision block. If PH is greater than 6, the program will exit through a Y branch entering into an action block wherein PH will be set equal to 1 in preparation to firing the SCR cell pair corresponding to the PH address of 1. On the other hand, if PH is not greater than 6, PH is not changed and the program exits through a N branch entering into an action block wherein the CURFLG location is set equal to 0 in preparation for the first current reading on the next pass through the program. The interrupt subroutine now calls a subroutine designated RDTACH as illustrated in FIG. 24.

Figure 24:
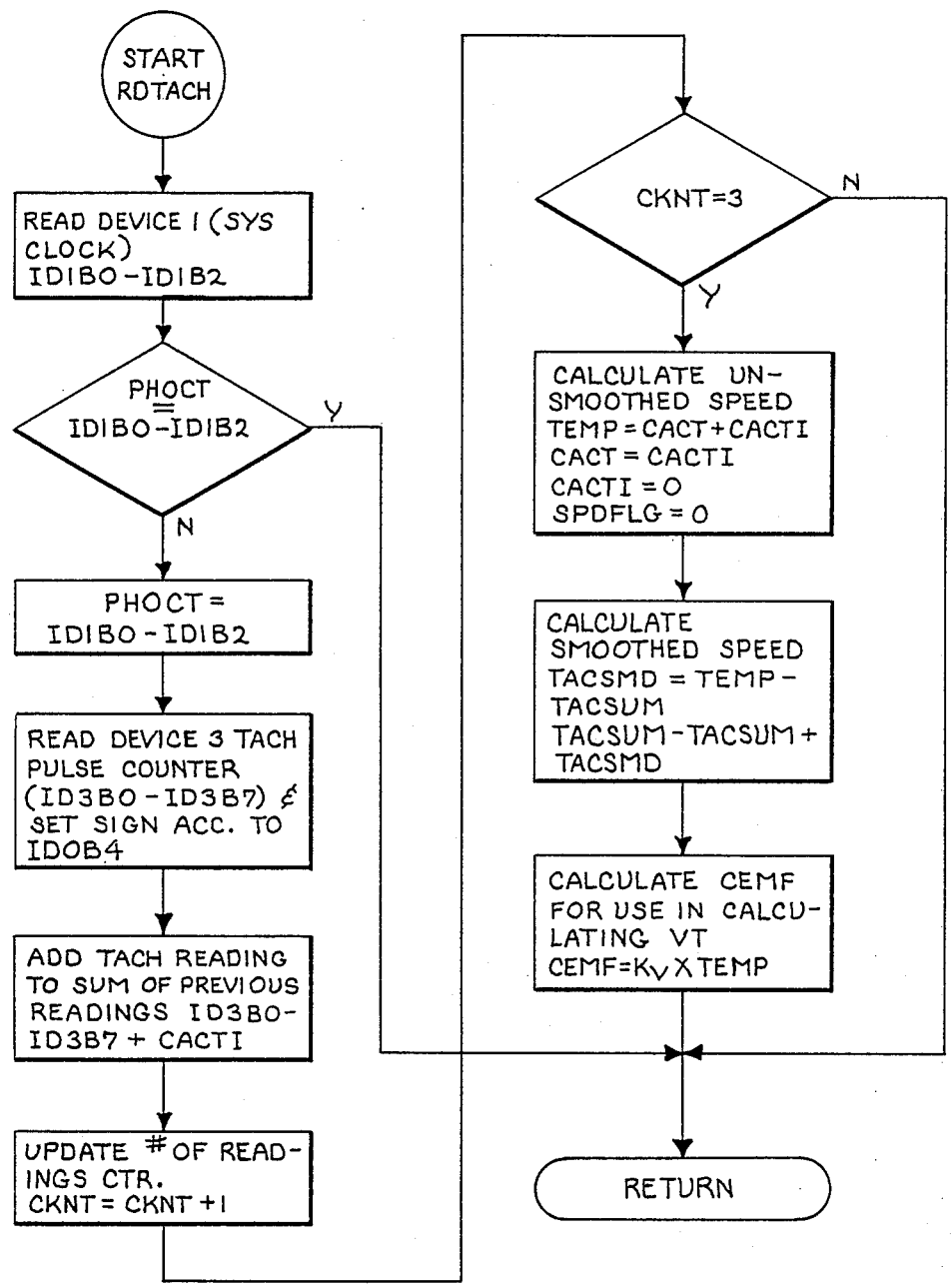

Reference is now made to FIG. 24, wherein the processor enters into a START RDTACH entry point to initiate the READ tachometer routine. In RDTACH the processor first reads input device 1, the system clock, by reading in the three most significant bits (ID1B0-ID1B2) of that clock. It will be recalled that these bits define the 60° interval of the input voltage when the reading is taken by the processor. The processor now enters into a PHOCT = ID1B0 − ID1B2 decision block. In this decision block, a test is performed to see if a phase to neutral zero crossing has occurred since the last pass through the subroutine. This is performed by comparing the three most significant bits of the 360° system clock (ID1B0-ID1B2) with location PHOCT which contains the reading or value of the 60° interval from the previous pass through the subroutine. A change in ID1B0-ID1B2 means that a 0 crossing has occurred and that a new value should be stored in PHOCT to update that location for subsequent tests. This is performed in an action block entered from a N branch of the PHOCT = ID1B0 − ID1B2 decision block, wherein PHOCT is set equal to ID1B0-ID1B2. On the other hand, if there has been no change in the zero crossing, then the program will exit through a Y branch and returns to FIG. 22 from the point where it left off entering into a CURFLG = 1 decision block.

Referring back to FIG. 24, let it now be assumed that a change has occurred in the zero crossing, thus changing the value of ID1B0-ID1B2. As a result, the program will now exit from the PHOCT = ID1B0 − ID1B2 decision block, set PHOCT as previously described and enter into an action block wherein the processor will now read device 3, the tach pulse counter, by reading bits ID3B0-ID3B7 and ID0B4 into the processor. Referring to FIG. 7, it will be recalled that bit ID0B4 was identified as that bit which specifies the direction the motor is running. Thus, in this action block, the value of the tach pulse counter is read into the processor and the sign of that value is set in accordance with the state of ID0B4. As such, the value of the tach pulse counter will represent either a positive or a negative number, indicating that the motor is running in either the forward or reverse directon. In the present system, the addressing of input device 3 through the 8 bit multiplexer of FIG. 4 also causes bit ID0B4 to be read through the multiplexer and placed into the processor simultaneously with the ID3B0 through ID3B7 bits.

Still referring to FIG. 24, the processor now proceeds to an action block wherein the tachometer reading is added to the sum of the previous readings taken by adding ID3B0-ID3B7 to a location CACTI, identified as a tach counter accumulator in memory. Thus it can be seen, for each pass through the RDTACH subroutine, that the tach readings from the tach pulse counter 88 are accumulated as a sum in location CACTI. The processor now proceeds into the next action block wherein a number of readings counter CKNT in memory is updated or incremented by 1 by setting CKNT = CKNT + 1. The purpose of the CNKT counter is to keep track of the number of accumulated readings in CACTI. This is indicated by a decision block CKNT = 3 in the right hand top portion of FIG. 24 which performs a test to see if there have been 3 readings accumulated. If CKNT does not equal 3, the speed smoothing calculations are not performed and the program exits through a N branch and returns to the interrupt subroutine where it left off entering at the CURFLG = 1 decision block of FIG. 22 as previously described.

Referring back to FIG. 24, let it now be assumed that three readings have been accumulated. The program exits through a Y branch entering into a decision block wherein the unsmoothed motor speed is calculated. This is accomplished by setting a location TEMP in memory equal to the sum of the accumulated tach pulses over the last two passes. This is average motor speed. The sum is accomplished by adding the contents of CACT, a memory location which stores the old sum of the tachometer speed readings, with the contents of location CACTI which contains the sum of the new tachometer readings. Also in this action block, location CACT is set equal to CACTI so that it reflects the sum of the old readings. Further, CACTI is set equal to zero so that it can be initialized to accumulate the sum of the next readings on subsequent passes. Further, a speed flag SPDFLG is initialized to a binary zero. SPDFLG is utilized, as will subsequently be described, to tell the processor to either perform the speed regulator calculations or to skip the speed regulator calculations. When SPDFLG is equal to zero, it indicates to the program to skip the speed regulator calculations. The program now proceeds into the next action block of FIG. 24, wherein the smooth speed is calculated. This is accomplished by setting a location TACSMD = location TEMP-TACSUM. Additionally in that action block, a location TACSUM is set equal to TACSUM + TACSMD. Location TACSUM contains a value proportional to the smoother speed and TACSMD is speed rate which can be seen to be a derivative of TACSUM. The program now proceeds to calculate the feed/forward counter electromotive force (CEMF) for subsequent use in calculating the motor terminal voltage VT. The CEMF is calculated by setting a location CEMF in memory equal to KV times location TEMP. KV is a constant stored in memory having the value derived from the formula KV = CEMF (VOLTS) divided by rpm.

Figure 22:
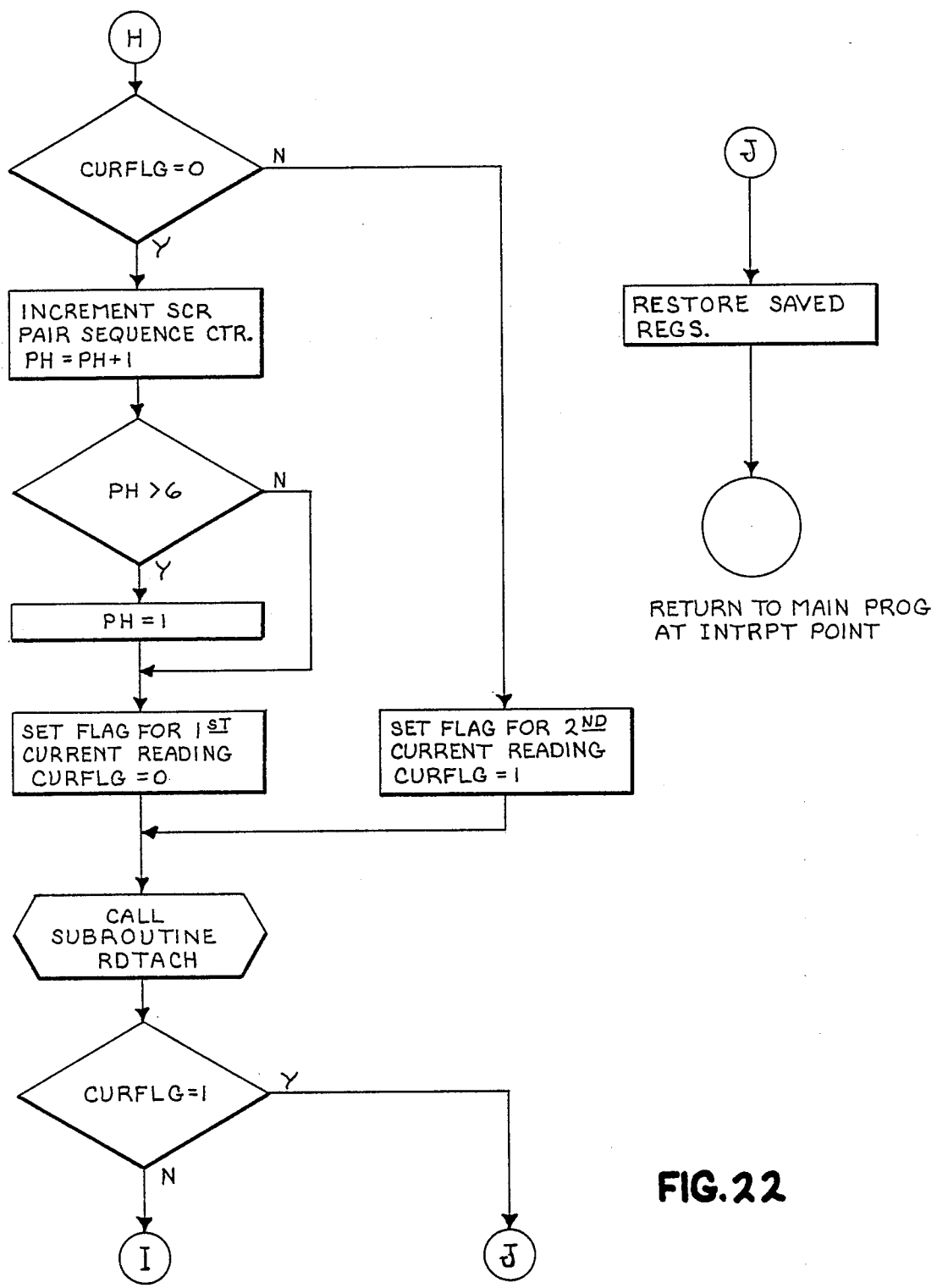

With the speed calculations now complete, the processor now returns back to the interrupt subroutine in FIG. 22 entering into the CURFLG = 1 decision block. In this decision block, if CURFLG is equal to 1 indicating that this is the second current reading, the program will not perform the current speed regulator calculations. Thus, the program will take a Y branch entering into point J at the top of FIG. 22, wherein the saved registers are restored as previously described and the program returned back to the main program at the point of interrupt in FIG. 15. Let it be assumed however that the CURFLG is not equal to 1, indicating that this is the first current reading, and that the processor now enters into a connector I of FIG. 23, wherein the speed flag SPDFLG is set equal to SPDFLG + 1. A test is now performed in a SPDFLG = 1 decision block to see if the speed flag is set. If the speed flag is set, the speed regulator calculations are performed by the program exiting through a Y branch of that decision block entering into an action block to calculate speed error.

The speed error is calculated by setting memory location ERRACT, a location for storing speed error, equal to the contents of location CHALF, speed set point, minus the contents of location CACT, the old sum of the speed reading or the speed before smoothing. Proceeding through the program, the processor now initiates the calculation of current setpoint by setting location ERRACT = G3 × ERRACT − G4 × TACSMD. G3 and G4 are regulator gains adjusted according to the particular drive motor to give the desired speed response. Values of G3 = 1 and G4 = 16 were used in this embodiment.

The processor now continues to calculate the current set point by setting a value TDESI = TDESI + ERRACT. The program now continues into a TDESI > CURLMP decision block at the top of FIG. 23. A maximum limit is placed on the motor current in the present drive system, and a test is performed to see if the value of TDESI, the calculated motor current, is greater than or less than specified current limits CURLMP and CURLMN. CURLMP is the positive current limit and CURLMN is the negative limit, as indicated in a TDESI < CURLMN decision block of FIG. 23. If TDESI is greater than CURLMP, the program exits through a Y branch entering into an action block where TDESI is set equal to the maximum current limit CURLMP. On the other hand, if CURLMP is not greater than TDESI, the program exits through an N branch into the TDESI < CURLMN decision block. If that test is positive, the program will exit through a Y branch into an action block wherein TDESI is set equal to CURLMN. On the other hand, if it is a negative test, the program will exit through an N branch entering to an action block wherein the current rate set point is now calculated. The current rate set point is calculated by setting a location in memory designated SPDESI (current set point rate) equal to TDESI (calculated current set point) minus DESI (the current set point) and dividing the difference by 3. The divisor 3 is utilized to take into consideration the averaging of the current rate set point over 3 passes through the current regulator calculation program for each speed regulator calculation.

A current rate limit is also placed on the current rate set point SPDESI. This is accomplished by the program now entering into an SPDESI > RTLMP decision block, wherein a test is performed to see if SPDESI is greater than RATLMP a positive rate limit. If it is greater, then the program exits through a Y branch into an SPDESI = RATLMP action block establishing a maximum positive rate limit for SPDESI. On the other hand, if SPDESI is less than RATLAMP, the program exits through an N branch entering into an SPDESI < RATLMN decision block. In that decision block, if SPDESI is less than RATLMN, the program exits through a Y branch, thus setting SPDESI=RATLMN, establishing a minimum rate limit. If SPDESI is not less than RATLMN, then the program exits through a NO branch, and enters into point J of FIG. 22, wherein the previously saved processor registers are restored and the program returns back to the main program at the point of interrupt as previously described.

Figure 23:
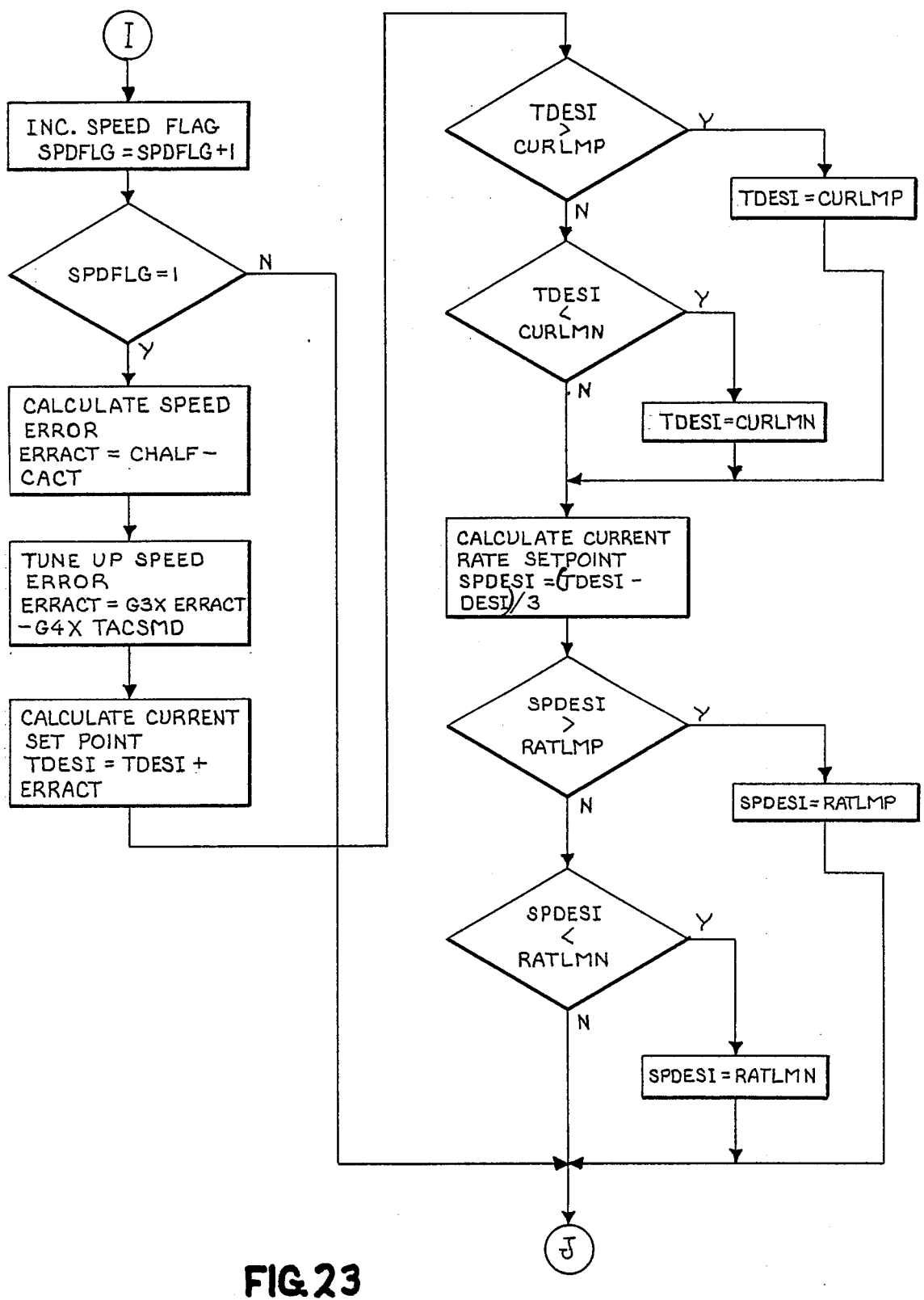

Still referring to FIG. 23, reference is made back to the SPDFLG = 1 decision block of that figure. If SPDFLG is equal to 1, it indicates that the speed regulator calculations are to be skipped over and thus the program exits from that block through an N branch entering back to point J of FIG. 22 as just described.

Reference is now made back to FIG. 16 to the 1st CURRENT READING CURFLG = 0 decision block, wherein a test performed to see if the program is taking the first or second current reading. If CURFLG is not equal to zero, it indicates that the first current reading has just been taken and, that the second current reading should be taken and the current regulator calculations performed. Under this condition, the processor will now exit through an N branch at connector C entering in to FIG. 18.

Figure 18:
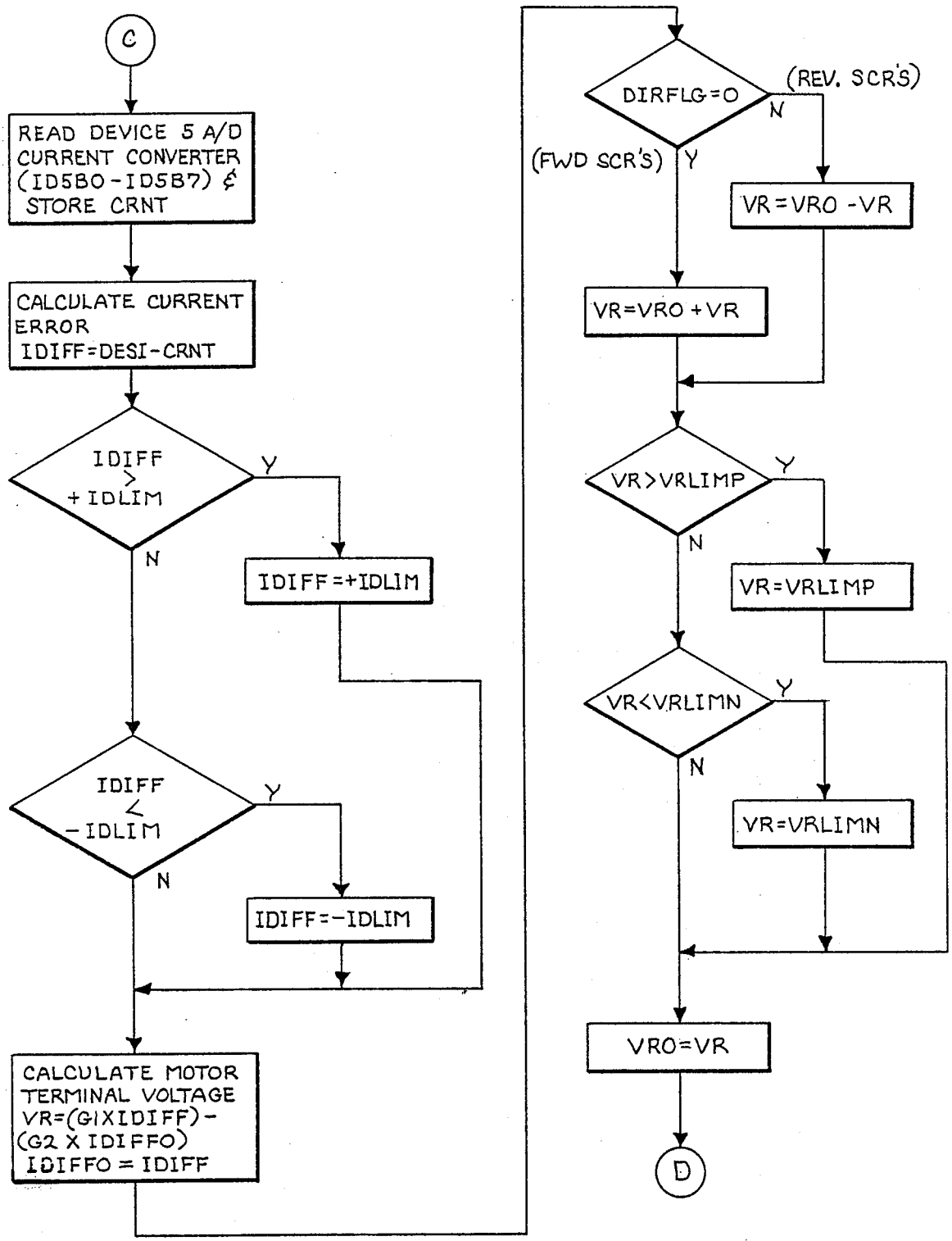

The first operation to take place in FIG. 18, is for the processor to send a read device 5 command to read the analog to digital current converter 80 and store bits ID5B0-ID5B7 in location CRNT, the location for storing actual motor current. The processor now enters into an action block and calculates the current error by setting location IDIFF equal to location DESI, the current set point, minus CRNT the actual motor current. A test is now performed in an IDIFF > + IDLIM decision block to determine if the current error is greater than a positive current error limit as specified the constant + IDLIM. If IDIFF is greater than + IDLIM, the program will branch through a Y exit entering to an action block to set IDIFF equal to + ID-LIM. On the other hand, if IDIFF is not greater than + IDLIM, the program exits through an N branch entering into an IDIFF < − IDLIM decision block. In this block, the same type of decision is made to determine if IDIFF is less than a negative or minimum current error limit. If it is, the program exits through a Y branch, wherein IDIFF is set equal to −IDLIM. On the other hand, if IDIFF is not less than −IDLIM the program exits through the N branch and enters into an action block, wherein the motor terminal voltage is calculated by the regulator.

The motor terminal voltage is calculated by setting a location VR, which is an intermediate value in the calculation, equal to (G1 × IDIFF) − (G2 × IDIFFO). Gains G1 and G2 were previously identified. Gain G1, for discontinuous current mode operation, is normally 2 to 3 times the value for continuous current operation and Gain G2 is equal to 0 for discontinuous current mode operation. The IDIFFO term is a location in memory which stores the old value of IDIFF. The program now proceeds to a DIRFLG = 0 decision block. In that decision block, a test is performed to see if the forward bridge is being fired by testing the condition of DIRFLG, a flag in memory which specifies which bridge is being fired. If DIRFLG is not equal to zero, indicating that the reverse bridge SCR's are being fired, exit is made through an N branch and VR is set equal to VRO-VR where, VRO is from a location in memory storing the old value of VR. If DIRFLG is equal to 0, indicating that the forward SCR's are being fired, the program exits through a Y branch into an action block wherein VR is set equal to VRO + VR.

Upon the completion of calculating VR, the program enters into a decision block VR > VRLIMP. There are two constants, (VRLIMP and VRLIMN) stored in memory which specify positive and negative limits on the maximum and minimum calculated voltage. If VR is greater than VRLIMP, then exit is made from that decision block through a Y branch into an action block wherein VR is set equal to VRLIMP. On the other hand, if VR is not greater than VRLIMP, an N branch is taken and entry is made into a VR < VRLIMN decision block. In that block, a Y branch is taken wherein VR set equal to VRLIMN if VR is less than VRLIMN. If not, an N branch is taken and VRO, the location for storing the old value of VR, is updated by setting VRO = VR.

Figure 19:
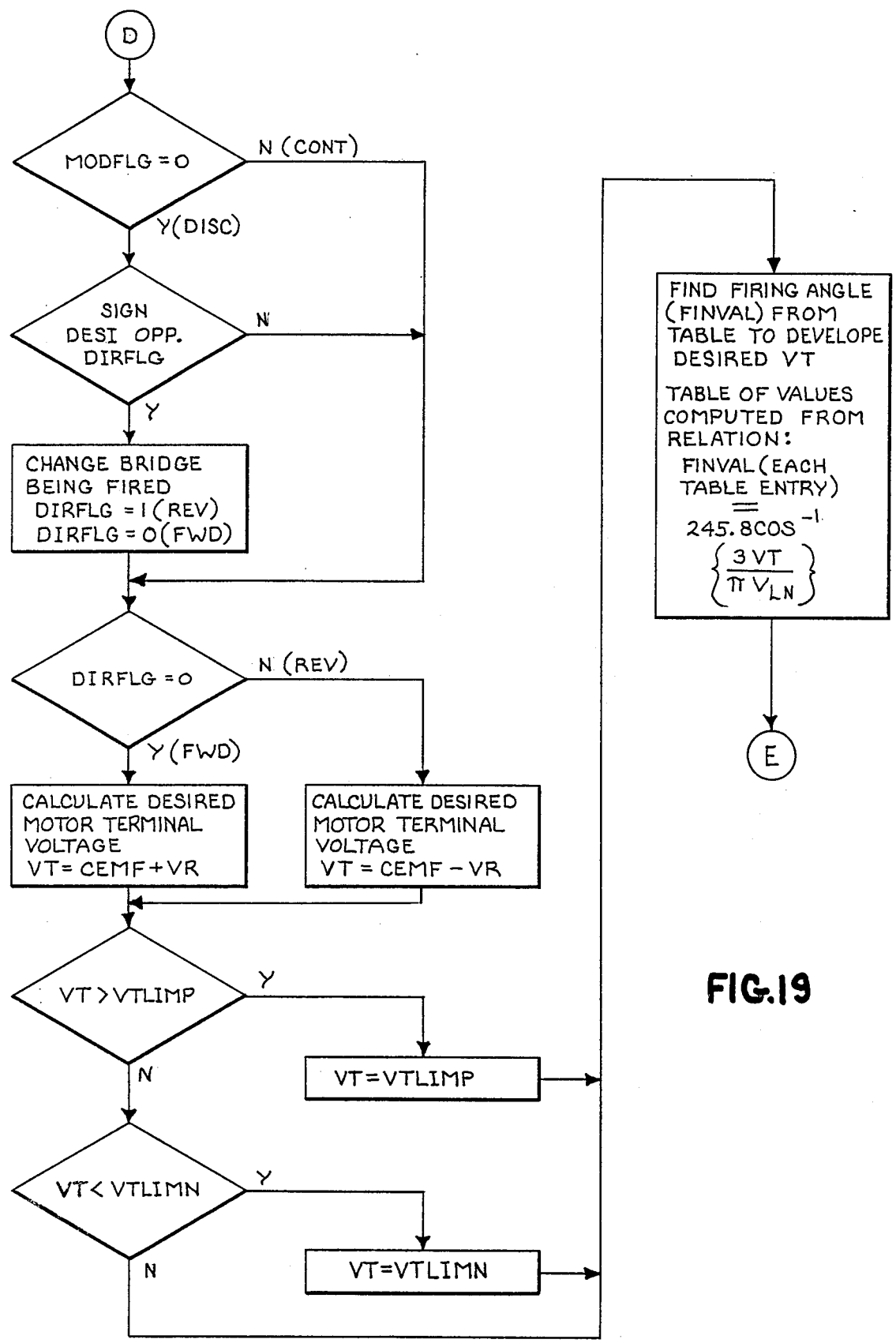

The program now enters into point D leaving FIG. 18 and entering point D. of FIG. 19. Upon entering into FIG. 19, the processor enters into an MODFLG = 0 decision block where a test is performed to see if the system is in continuous or discontinuous current mode. If the MODFLG is not equal to 0, it indicates that the system is in continuous mode. Thus, the processor exits from a N branch entering to a DIRFLG = 0 decision block. It is in the flow chart of FIG. 19 where the decision is made as to whether it is appropriate to reverse the direction of the motor. The criteria for reversal of the motor is that the system must be in discontinuous current mode and the sign of the current set point (DESI) must be opposite to the direction flag (DIRFLG). This determination of current reversal is explained as follows. If the MODFLG = 0 decision test is positive, the processor will exit through a Y branch indicating discontinuous mode into a sign of DESI OPP DIRFLG decision block. In this latter decision block, the determination is made to see if DESI is opposite to DIRFLG. If it is not opposite, an N branch is taken and the program enters into the DIRFLG = 0 decision block as previously described. However, if the DESI is opposite DIRFLG, the program takes a Y branch and enters in to an action block, wherein the direction flag DIRFLG is reversed from its present state. As shown in that action block, if DIRFLG is set equal to a 1, it indicates that current will flow in the reverse bridge and not the forward bridge. If DIRFLG is set equal to zero, then the forward bridge will be fired. The program now proceeds into the DIRFLG = 0 decision block to determine the relative polarity of CEMF and voltage from the bridge. If the reverse bridge is to be fired, the N branch is taken from that decision block and entry is made into an action block, wherein the desired terminal voltage VT is calculated by setting VT = CEMF (the counter electromotive force) minus VR (the motor voltage since the polarities are opposite). If the forward bridge is to be fired, as indicated by DIRFLG = 0, then entry is made through the Y branch into an action block wherein the desired motor terminal voltage VT is calculated by setting VT = CEMF + VR to establish its proper polarity.

In the present system, the motor terminal voltage has positive and negative limits placed on it and thus the tests immediately following the calculation of VT are to determine whether VT is equal to or less than positive and negative limits. The first decision block after the calculation of VT is VT > VTLIMP. If VT is in excess of the positive limit, a Y branch is taken into an action block, wherein VT is set equal to the maximum positive limit VTLIMP. On the other hand, if VT is less than VTLIMP, a N branch is taken and a similar test for VT < VTLIMN is performed. If VT is less than the minimum limit, then a Y branch is taken and VT is set equal to VTLIMN. If not, the N branch is taken from the VT < VTLIMN decision and entry is then made into an action block of FIG. 19 wherein the firing angle FINVAL to develop the desired VT is extracted from the table of values computed on the previously described relation FINVAL = 245.8 cos −1 (3VT/π $V_{LN}$) as previously described. It will be recalled that these values of FINVAL were previously described and shown in Table 1. This type of table entry, is well known in the art and is a straight-forward manner of merely addressing the table at an address specified by the value of VT, and using the value of the location addressed as the firing angle FINVAL.

The program now exits FIG. 19 at connector E and enters in at connector E of FIG. 20 wherein the system clock is read by the processor in a manner as previously described. The program will not continue to execute in FIG. 20, and proceed through its execution, finally returning to the interrupt point of the main program in the manner as previously described.

Having described the invention in detail, it can now be appreciated that the overall structure and method of the present system consists of a main program which loops continuously to read the speed reference switches and the motor direction switch and compute the speed set-point for the motor. The interrupt program accepts speed set-point data from the main program and reads motor speed armature current, and time as measured by the 360° system clock. The interrupt program further calculates the desired firing angle for the SCR's and controls the processor to send data having a value proportional to firing angle to a counter in the system and an address word to an SCR select to effect the generators of gating pulses for the direct digital firing of SCR's as selected by the address data to regulate and control a reversing 3-phase drive motor system. The program is synchronized with the firing of the SCR's by virtue of the generation of an interrupt at each SCR firing to start the regulator calculations to load the counter at the proper time to control the time of firing a next SCR to be fired.

The processor of the system reads armature current twice each 60 electrical degrees. A first armature current reading is taken at a predetermined time (e.g. 4°) before the next SCR is to be fired. This first current reading is used to determine the mode of the current regulator operation, (continuous or discontinuous). A second current reading is taken and regulator calculations are started approximately 20° after the previous firing of an SCR. The second current reading is used by the current regulator program as current feedback for controlling the overall current regulator.

Thus it is seen, that there has been shown and described a regulating and control system for controlling a load such as DC motor which enjoys the benefits of a processor, such as a microcomputer, and which far exceeds the capabilities of prior analog regulating and control systems with limited additional expense. While there has been shown and described what is at present considered to be the preferred embodiment of the present invention, modifications thereto will readily occur to those skilled in the art. It is not desired therefore, that the invention be limited to the specific method and logic structure shown and described and it is intended to cover in the appended claims all such modifications as fall within the true spirit and scope of the invention.

What is claimed is:

1. In a system of the type including a data processor programmed to read system parameters and perform calculations, a method of deriving a value proportional to a firing angle to develop a firing pulse to fire controllable rectifiers connected between an AC source and a DC motor to control the transfer of power from the AC source to the DC motor comprising the steps of:
   (a) generating indicia synchronized with the AC source specifying a first value proportional to a phase interval of the AC source derived from phase crossings of the AC source and a second value synchronized with the first value specifying an increment of time within that phase interval;
   (b) directing the processor to selectively read system parameters proportional to desired motor speed, actual motor speed and motor current and said indicia;
   (c) calculating, in the processor, a value which specifies a time to use a calculated firing angle by comparing said second value with a predetermined constant proportional to system calculation time;
   (d) calculating, in the processor, a value proportional to a required motor terminal voltage from the system parameters read thereby;
   (e) selecting, in the processor, a value proportional to firing angle in accordance with the value of said calculated motor terminal voltage;
   (f) deriving, in said processor, an address of a rectifier to be fired from said first value;
   (g) selecting, in said processor, a firing angle in accordance with the value of said calculated motor terminal voltage;
   (h) repeatedly comparing the value of the calculated time to use said firing angle with said second value to get a comparison;
   (i) incrementally changing the magnitude of said firing angle starting at a time when said comparison is achieved; and
   (j) generating a firing pulse to fire a rectifier specified by said derived address when the magnitude of said firing angle achieves a specified value.

2. A digital speed regulator for applying firing pulses to controllable rectifiers connected between an AC source and a DC motor to deliver power from the AC source to the motor comprising:

(a) means for generating a basic clock signal;

(b) means coupled to the AC source and responsive to said clock signal for generating indicia synchronized with the AC source specifying a first value proportional to a phase interval of the AC source derived from detected phase crossings of the AC source and a second value synchronized with said first value and said clock signal specifying an increment of time within that interval;

(c) means for generating a first parameter proportional to motor current;

(d) means for generating a second parameter proportional to desired motor speed;

(e) means for generating a third parameter proportional to actual motor speed;

(f) a data processor programmed to selectively read said parameters and indicia, in response to an interrupt signal provided thereto to select a value proportional to firing angle from the magnitude of required motor terminal voltage derived from said parameters and indicia, calculate from said second value a time to externally transfer said firing angle and determine an address of a rectifier to be fired from said first value for external transfer;

(g) selector means connected to the rectifiers and receiving said rectifier address from said processor to effect the selection of the rectifier to be fired; and (h) means including counter means for receiving the selected firing angle from said processor at a time specified by the calculated time to externally transfer, said counter means responsive to said clock signal to count the contents of said counter to effect the generation of a firing pulse to said selector means to fire the addressed rectifier and provide said interrupt signal to said processor when said counter achieves a specified count.

3. A method of controlling the gain in a closed loop digital control system in continuous and discontinuous current modes of operation of the type including a DC motor and a data processor having stored values and programmed to calculate a firing angle from system parameters proportional to desired motor speed, actual motor speed and motor current to develop a firing pulse to fire a rectifier connected between an AC source and the DC motor to control the transfer of power between the AC source and the DC motor comprising the steps of:

(a) reading motor current into the processor a first time;

(b) comparing said motor current, in said processor, with a stored value proportional to a predetermined current and establishing one of the two system current modes of operation in accordance with the results of the comparison;

(c) selecting, in the processor, a stored value proportional to a predetermined system gain in accordance with the established current mode of operation;

(d) signalling the processor after a predetermined delay, to (1) selectively read said system parameters, including reading the motor current a second time, (2) calculate a value proportional to a required motor terminal voltage from said system parameters and the selected system gain;

(3) select a stored digital value proportional to firing angle using the value specified by the calculated motor terminal voltage;

(e) incrementally changing the magnitude of the selected firing angle; and (f) providing a firing pulse to fire the rectifier when the magnitude of the firing angle achieves a specified value.

4. A method of controlling the direction of motor rotation of a DC motor in a closed loop control system of the type capable of operating in continuous and discontinuous current modes of operation including a data processor having stored values and programmed to calculate a firing angle from system parameters provided thereto proportional to desired and actual motor speed and desired and actual direction of motor rotation, and a reversible polarity motor current to develop a firing pulse to fire a selected rectifier in a reversible bridge connected between an AC source and the DC motor comprising the steps of:

(a) directing the processor to selectively read the system parameters, including reading the motor current a first time;

(b) calculating, in the processor, a desired motor current from the motor speed parameters;

(c) comparing said motor current, in said processor, with a stored value proportional to a predetermined current and establishing one of the two current modes of operation in accordance with the results of the comparison as a first criteria for motor reversal;

(d) signalling the processor, after a predetermined delay, to (1) selectively read said system parameters, including reading the motor current a second time, (2) compare the polarities of the previously calculated desired motor current and a previously established value indicating the presently selected rectifier, and if the polarities are opposite, establish a second criteria for motor reversal, (3) select an opposite rectifier to be fired if the first established criteria specifies discontinuous current mode of operation and the first criteria was met, (4) calculate a value proportional to a required motor terminal voltage from the previously read system parameters, (5) select a stored digital value proportional to firing angle using the value specified by the calculated motor terminal voltage;

(e) incrementally changing the magnitude of the selected firing angle; and (f) providing a firing pulse to fire the selected rectifier when the magnitude of the firing angle achieves a specified value to effect motor reversal as if an opposite rectifier was selected.

5. A method of controlling a DC motor in a system of the type programmed to read system parameters and perform calculations to derive a value proportional to firing angle to develop a firing pulse to fire a selected controllable rectifier pair in a reversible bridge connected between a polyphase AC source and the DC motor to control the transfer of power between the AC source and the DC motor to control the speed and direction of rotation thereof comprising the steps of:

(a) generating indicia synchronized with the AC source specifying a first value proportional to a phase interval of the AC source derived from phase crossings of the AC source and a second value synchronized with the first value specifying an increment of time within that phase interval;

(b) directing the processor to selectively read system parameters proportional to desired and actual motor speed, desired and actual direction of motor rotation, and said indicia, including reading motor current a first time;

(c) comparing said motor current, in said processor, with a stored value proportional to a predetermined current and establishing one of the two system current modes of operation in accordance with the results of the comparison as a first criteria for selection of an opposite rectifier pair;

(d) selecting, in the processor, a stored value proportional to a predetermined system gain in accordance with the established current mode of operation;

(e) calculating, in the processor, a desired motor current from the motor speed parameters;

(f) reading the indicia and deriving from the first value thereof an address for a rectifier pair to be fired, (g) signalling the processor, after a predetermined delay, to
 (1) selectively read said system parameters, including reading the motor current a second time,
 (2) compare the polarities of the previously calculated desired motor current and a previously established value indicating the selected rectifier pair in said bridge, and if the polarities are opposite, establish a second criteria for motor reversal,
 (3) read said indicia
 (4) calculate a value which specifies a time to use a calculated firing angle by combining said second value with a predetermined constant proportional to system calculation time,
 (5) calculate a value proportional to required motor terminal voltage from said sysem parameters and the selected system gain,
 (6) select a previously calculated value proportional to firing angle in accordance with the value of said calculated motor terminal voltage;

(h) transferring the derived rectifier pair address to said bridge to address a pair as specified by said second criteria;

(i) repeatedly comparing the calculated time to use said firing angle with said second value to get a comparison; and (j) incrementally changing the magnitude of said firing angle starting at a time when said comparison is achieved, and (k) generating a firing pulse to the addressed rectifier pair to control the speed and direction of rotation of the DC motor when the magnitude of said firing angle achieves a specified value.

6. The system in accordance with claim 1 wherein said first and second values are each comprised of a series of pulses, the pulses of said first value being derived from the phase crossings of the AC source with the spacing between each of the pulses of said first value defining one of a plurality of phase intervals of the AC source, and the pulses of said second value occurring between the pulses of said first value, with each pulse of said second value representative of a predetermined increment of degrees defining time in the phase interval between the pulses of said first value.

7. The system in accordance with claim 1 wherein the step of generating said firing pulse further includes the step of using said firing pulse to direct the processor to repeat steps (b) through (j).

8. The system in accordance with claim 1 wherein a plurality of different values proportional to firing angle are stored in the processor and the value of said calculated motor terminal voltage serves as an address to select an appropriate one of the values proportional to firing angle.

9. The digital speed regulator in accordance with claim 2 wherein said first and second values are each comprised of a series of pulses, the pulses of said first value being derived from the phase crossings of the AC source with the spacing between each of the pulses of said first value defining one of a plurality of pulse intervals of the AC source, and the pulses of said second value occurring between the pulses of said first value, with each pulse of said second value representative of a predetermined increment of degrees defining time in the phase interval between the pulses of said first value.

10. The digital speed regulator in accordance with claim 2 wherein said interrupt signal to said processor is derived from said firing pulse.

11. The digital speed regulator in accordance with claim 2 wherein a plurality of different values proportional to firing angle are stored in said processor and the value of said calculated motor terminal voltage serves as an address to select an appropriate one of the values proportional to firing angle.

12. The system in accordance with claim 3 wherein the discontinuous current mode of operation is established when the motor current is less than the stored value proportional to said predetermined current and the continuous current mode of operation is established when the motor current is greater than the stored value proportional to said predetermined current.

13. The system in accordance with claim 3 wherein the step of selecting, in the processor, said stored value proportional to said predetermined gain further includes the step of establishing said predetermined delay for signaling the processor.

14. The system in accordance with claim 3 wherein said firing pulse is provided to fire the rectifier when the firing angle achieves the value of zero.

15. The system in accordance with claim 4 wherein the discontinuous current mode of operation is established when the motor current is less than the stored value proportional to said predetermined current and the continuous current mode of operation is established when the motor current is greater than the stored value proportional to said predetermined current.

16. The system in accordance with claim 4 wherein the step of comparing said motor current, in the processor, with said stored value proportional to said predetermined current further includes the step of establishing said predetermined delay for signaling the processor.

17. The system in accordance with claim 4 wherein said firing pulse is provided to fire the selected rectifier when the firing angle achieves the value of zero.

* * * * *